United States Patent
Peng et al.

(10) Patent No.: US 10,681,064 B2
(45) Date of Patent: Jun. 9, 2020

(54) ANALYSIS OF COMPLEX RELATIONSHIPS AMONG INFORMATION TECHNOLOGY SECURITY-RELEVANT ENTITIES USING A NETWORK GRAPH

(71) Applicant: SAP SE, Walldorf (DE)

(72) Inventors: Wei-Guo Peng, Dallau (DE); Lin Luo, Wiesloch (DE); Eugen Pritzkau, Wiesloch (DE); Hartwig Seifert, Elchesheim-Illingen (DE); Harish Mehta, Wiesenbach (DE); Nan Zhang, Schriesheim (DE); Thorsten Menke, Bad Iburg (DE); Jona Hassforther, Heidelberg (DE); Rita Merkel, Ilvesheim (DE); Florian Chrosziel, St. Leon-Rot (DE); Kathrin Nos, Nussloch (DE); Marco Rodeck, Maikammer (DE); Thomas Kunz, Lobbach/Lobenfeld (DE)

(73) Assignee: SAP SE, Walldorf (DE)

( * ) Notice: Subject to any disclaimer, the term of this patent is extended or adjusted under 35 U.S.C. 154(b) by 346 days.

(21) Appl. No.: 15/847,450

(22) Filed: Dec. 19, 2017

(65) Prior Publication Data

US 2019/0190927 A1    Jun. 20, 2019

(51) Int. Cl.
| | |
|---|---|
| *H04L 29/06* | (2006.01) |
| *H04L 12/24* | (2006.01) |
| *H04L 12/26* | (2006.01) |
| *G06T 11/20* | (2006.01) |
| *G06F 16/901* | (2019.01) |

(52) U.S. Cl.
CPC ...... *H04L 63/1416* (2013.01); *H04L 41/0604* (2013.01); *H04L 41/069* (2013.01); *H04L 41/22* (2013.01); *H04L 43/045* (2013.01); *H04L 63/1425* (2013.01); *G06F 16/9024* (2019.01); *G06T 11/203* (2013.01); *H04L 63/0236* (2013.01); *H04L 63/0263* (2013.01)

(58) Field of Classification Search
USPC .................................................. 726/23
See application file for complete search history.

(56) References Cited

U.S. PATENT DOCUMENTS

| | | |
|---|---|---|
| 5,440,726 A | 8/1995 | Fuchs |
| 5,960,170 A | 9/1999 | Chen |

(Continued)

OTHER PUBLICATIONS

Office Action issued in U.S. Appl. No. 15/847,478, dated Aug. 6, 2019, 36 pages.

(Continued)

*Primary Examiner* — Shin-Hon (Eric) Chen
(74) *Attorney, Agent, or Firm* — Fish & Richardson P.C.

(57) ABSTRACT

A filter is selected from one or more filters defined for an ETD Network Graph. Events are fetched from the selected log files based on the selected filter and entities identified based on the fetched Events. Relationships are determined between the identified entities, and the determined relationships and identified entities are displayed in the ETD Network Graph. An identified entity is selected to filter data in an ETD Event Series Chart. An Event is selected in the ETD Event Series Chart to display Event Attributes in an Event Attribute Dialog. An Event Attribute is selected in the Event Attribute Dialog to filter Events in the ETD Event Series Chart.

15 Claims, 17 Drawing Sheets

(56) References Cited

U.S. PATENT DOCUMENTS

| | | |
|---|---|---|
| 6,173,418 B1 | 1/2001 | Fujino et al. |
| 6,629,106 B1 | 9/2003 | Narayanaswamy |
| 6,779,001 B1 | 8/2004 | Kanai et al. |
| 7,376,969 B1 | 5/2008 | Njemanze |
| 7,380,205 B2 | 5/2008 | Bezrukov et al. |
| 7,441,197 B2 | 10/2008 | Tschiegg et al. |
| 7,457,792 B2 | 11/2008 | Weigt et al. |
| 7,457,793 B2 | 11/2008 | Weigt et al. |
| 7,457,794 B2 | 11/2008 | Weigt et al. |
| 7,545,969 B2 | 6/2009 | Bennett |
| 7,624,092 B2 | 11/2009 | Lieske et al. |
| 7,627,544 B2 | 12/2009 | Chkodrov |
| 7,756,808 B2 | 7/2010 | Weigt et al. |
| 7,756,809 B2 | 7/2010 | Weigt et al. |
| 7,761,396 B2 | 7/2010 | Weigt et al. |
| 7,783,723 B2 | 8/2010 | Peng et al. |
| 7,788,718 B1 | 8/2010 | Fei |
| 7,872,982 B2 | 1/2011 | Atkins |
| 7,908,660 B2 | 3/2011 | Bahl |
| 7,934,257 B1 | 4/2011 | Kienzle |
| 7,961,633 B2 | 6/2011 | Shankar |
| 7,971,209 B2 | 6/2011 | Eberlein et al. |
| 8,051,034 B2 | 11/2011 | Mehta et al. |
| 8,091,117 B2 | 1/2012 | Williams |
| 8,474,047 B2 | 6/2013 | Adelstein |
| 8,484,726 B1 | 7/2013 | Sutton |
| 8,554,907 B1 | 10/2013 | Chen et al. |
| 8,661,103 B2 | 2/2014 | Mehta et al. |
| 8,775,671 B2 | 7/2014 | Rodeck et al. |
| 8,892,454 B2 | 11/2014 | Rabetge et al. |
| 8,954,602 B2 | 2/2015 | Seifert et al. |
| 8,973,147 B2 | 3/2015 | Pearcy |
| 9,037,678 B2 | 5/2015 | Mehta et al. |
| 9,075,633 B2 | 7/2015 | Nos |
| 9,106,697 B2 | 8/2015 | Capalik et al. |
| 9,116,906 B2 | 8/2015 | Nos et al. |
| 9,148,488 B2 | 9/2015 | Rabetge et al. |
| 9,170,951 B1 | 10/2015 | He |
| 9,251,011 B2 | 2/2016 | Meier et al. |
| 9,262,519 B1 | 2/2016 | Saurabh |
| 9,304,978 B2 | 4/2016 | Bezrukov et al. |
| 9,313,421 B2 | 4/2016 | Deshpande |
| 9,336,385 B1 | 5/2016 | Spencer |
| 9,348,665 B2 | 5/2016 | Storz et al. |
| 9,383,934 B1 | 7/2016 | Likacs |
| 9,419,989 B2 | 8/2016 | Harris |
| 9,524,389 B1 | 12/2016 | Roth |
| 9,619,984 B2 | 4/2017 | Donovan |
| 9,690,931 B1 | 6/2017 | Anantharaju et al. |
| 9,779,147 B1 | 10/2017 | Sherman et al. |
| 9,779,150 B1 | 10/2017 | Sherman |
| 9,843,596 B1 | 12/2017 | Avelbuch |
| 9,979,741 B2 | 5/2018 | Fehrman |
| 10,001,389 B1 | 6/2018 | Das et al. |
| 10,003,605 B2 * | 6/2018 | Muddu ............... H04L 63/20 |
| 10,079,842 B1 | 9/2018 | Brandwine et al. |
| 10,102,379 B1 | 10/2018 | Seifert et al. |
| 10,140,447 B2 | 11/2018 | Rahaman et al. |
| 10,148,675 B1 | 12/2018 | Brandwine et al. |
| 2002/0070953 A1 | 6/2002 | Barg |
| 2003/0074471 A1 | 4/2003 | Anderson |
| 2003/0115484 A1 | 6/2003 | Mariconi et al. |
| 2003/0217137 A1 | 11/2003 | Roese |
| 2004/0015481 A1 | 1/2004 | Zinda |
| 2004/0044912 A1 | 3/2004 | Connary |
| 2004/0078490 A1 | 4/2004 | Anderson |
| 2004/0093513 A1 | 5/2004 | Cantrell |
| 2006/0037075 A1 | 2/2006 | Frattura |
| 2006/0059115 A1 | 3/2006 | Gulfleisch et al. |
| 2006/0161816 A1 | 7/2006 | Gula et al. |
| 2006/0106847 A1 | 9/2006 | Whitney |
| 2006/0253907 A1 | 11/2006 | McConnell |
| 2007/0067438 A1 | 3/2007 | Goranson et al. |
| 2007/0073519 A1 | 3/2007 | Long |
| 2007/0100905 A1 | 5/2007 | Masters et al. |
| 2007/0115998 A1 | 5/2007 | McEligott |
| 2007/0136437 A1 | 6/2007 | Shankar et al. |
| 2007/0150596 A1 | 6/2007 | Miller et al. |
| 2007/0183389 A1 | 8/2007 | Clee |
| 2007/0186284 A1 | 8/2007 | McConnell |
| 2007/0266387 A1 | 11/2007 | Henmi |
| 2007/0283192 A1 | 12/2007 | Shevchenko |
| 2007/0300296 A1 | 12/2007 | Kudla |
| 2008/0033966 A1 | 2/2008 | Wahl |
| 2008/0034425 A1 | 2/2008 | Overcash et al. |
| 2008/0080384 A1 | 4/2008 | Atkins |
| 2008/0091681 A1 | 4/2008 | Dwivedi |
| 2008/0163085 A1 | 7/2008 | Subbu et al. |
| 2008/0288889 A1 | 11/2008 | Hunt et al. |
| 2008/0295173 A1 | 11/2008 | Tsvetanov |
| 2008/0320552 A1 | 12/2008 | Kumar |
| 2009/0044277 A1 | 2/2009 | Aaron et al. |
| 2009/0049518 A1 | 2/2009 | Roman |
| 2009/0288164 A1 | 11/2009 | Adelstein |
| 2009/0293046 A1 | 11/2009 | Cheriton |
| 2009/0300045 A1 | 12/2009 | Chaudhry et al. |
| 2009/0312026 A1 | 12/2009 | Parameswar |
| 2010/0011031 A1 | 1/2010 | Huang |
| 2010/0114832 A1 | 5/2010 | Lillibridge |
| 2010/0180325 A1 | 7/2010 | Golobay |
| 2011/0098928 A1 | 4/2011 | Hoffman et al. |
| 2011/0213741 A1 | 9/2011 | Shama |
| 2011/0277034 A1 | 11/2011 | Hanson |
| 2011/0320816 A1 | 12/2011 | Yao |
| 2012/0005542 A1 | 1/2012 | Petersen |
| 2012/0158653 A1 | 6/2012 | Shaffer et al. |
| 2012/0167161 A1 | 6/2012 | Kim et al. |
| 2012/0191660 A1 | 7/2012 | Hoog |
| 2012/0210434 A1 | 8/2012 | Curtis et al. |
| 2012/0271748 A1 | 10/2012 | DiSalvo |
| 2012/0271790 A1 | 10/2012 | Lappas et al. |
| 2012/0317078 A1 | 12/2012 | Zhou et al. |
| 2013/0086023 A1 | 4/2013 | Tsukamoto et al. |
| 2013/0106830 A1 | 5/2013 | de Loera |
| 2013/0198840 A1 | 8/2013 | Drissi et al. |
| 2013/0212709 A1 | 8/2013 | Tucker |
| 2013/0262311 A1 | 10/2013 | Buhrmann |
| 2013/0298243 A1 | 11/2013 | Kumar et al. |
| 2013/0304665 A1 | 11/2013 | Rodeck et al. |
| 2013/0304666 A1 | 11/2013 | Rodeck et al. |
| 2013/0305369 A1 | 11/2013 | Karta |
| 2013/0326079 A1 | 12/2013 | Seifert et al. |
| 2013/0347111 A1 | 12/2013 | Karta |
| 2014/0047413 A1 | 2/2014 | Shelve et al. |
| 2014/0201836 A1 | 7/2014 | Amsler |
| 2014/0223283 A1 | 8/2014 | Hancock |
| 2014/0244623 A1 | 8/2014 | King |
| 2014/0317681 A1 | 10/2014 | Shende |
| 2015/0007325 A1 | 1/2015 | Eliseev |
| 2015/0067880 A1 | 3/2015 | Ward |
| 2015/0073868 A1 | 3/2015 | Garman |
| 2015/0106867 A1 | 4/2015 | Liang |
| 2015/0143521 A1 | 5/2015 | Eliseev |
| 2015/0154524 A1 | 6/2015 | Borodow |
| 2015/0180891 A1 | 6/2015 | Seward |
| 2015/0215329 A1 | 7/2015 | Singla |
| 2015/0237065 A1 | 8/2015 | Roytman |
| 2015/0264011 A1 | 9/2015 | Liang |
| 2015/0278371 A1 | 10/2015 | Anand |
| 2015/0281278 A1 | 10/2015 | Gooding |
| 2015/0310070 A1 | 10/2015 | Stetik et al. |
| 2015/0319185 A1 | 11/2015 | Kirti |
| 2015/0341389 A1 | 11/2015 | Kurakami |
| 2015/0347751 A1 | 12/2015 | Card et al. |
| 2015/0355957 A1 | 12/2015 | Steiner |
| 2015/0358344 A1 | 12/2015 | Mumcuoglu |
| 2015/0381646 A1 | 12/2015 | Lin |
| 2016/0057166 A1 | 2/2016 | Chesla |
| 2016/0057167 A1 | 2/2016 | Bach et al. |
| 2016/0065594 A1 | 3/2016 | Srivastava et al. |
| 2016/0092535 A1 | 3/2016 | Kuchibhotla et al. |
| 2016/0127391 A1 | 5/2016 | Kobres |
| 2016/0164891 A1 | 6/2016 | Satish et al. |
| 2016/0202893 A1 | 7/2016 | Mustonen et al. |

(56) References Cited

U.S. PATENT DOCUMENTS

| | | |
|---|---|---|
| 2016/0226905 A1 | 8/2016 | Baikalov et al. |
| 2016/0248798 A1 | 8/2016 | Cabrera et al. |
| 2016/0291982 A1 | 10/2016 | Mizrahi |
| 2016/0292061 A1 | 10/2016 | Marron |
| 2016/0337384 A1 | 11/2016 | Jansson |
| 2016/0359886 A1 | 12/2016 | Yadav et al. |
| 2016/0364315 A1 | 12/2016 | Lee |
| 2016/0364571 A1 | 12/2016 | Lee |
| 2016/0364740 A1 | 12/2016 | Parker |
| 2016/0373476 A1 | 12/2016 | Dell'anno et al. |
| 2016/0378978 A1 | 12/2016 | Singla |
| 2016/0381049 A1 | 12/2016 | Lakhani |
| 2017/0004005 A1 | 1/2017 | Elliott |
| 2017/0026400 A1 | 1/2017 | Adams et al. |
| 2017/0031002 A1 | 2/2017 | Newton et al. |
| 2017/0034023 A1 | 2/2017 | Nickolov |
| 2017/0070415 A1 | 3/2017 | Bell et al. |
| 2017/0091008 A1 | 3/2017 | Cherbakov |
| 2017/0093902 A1 | 3/2017 | Roundy et al. |
| 2017/0148060 A1 | 5/2017 | Showers |
| 2017/0169217 A1 | 6/2017 | Rahaman |
| 2017/0195439 A1* | 7/2017 | Dixon ................ H04L 61/2007 |
| 2017/0251365 A1 | 8/2017 | Burchard |
| 2017/0270006 A1 | 9/2017 | Kankylas |
| 2017/0279837 A1 | 9/2017 | Dasgupta |
| 2017/0287179 A1* | 10/2017 | Tibshirani ............. G06T 11/206 |
| 2017/0302685 A1 | 10/2017 | Ladnai et al. |
| 2017/0308602 A1 | 10/2017 | Raghunathan et al. |
| 2017/0310690 A1 | 10/2017 | Mestha et al. |
| 2017/0316026 A1 | 11/2017 | Kanthak et al. |
| 2017/0322993 A1 | 11/2017 | Brodt et al. |
| 2017/0324766 A1 | 11/2017 | Gonzalez |
| 2018/0027002 A1 | 1/2018 | Rodeck et al. |
| 2018/0027010 A1 | 1/2018 | Pritzkau et al. |
| 2018/0059876 A1 | 3/2018 | Peng et al. |
| 2018/0063167 A1 | 3/2018 | Rodeck |
| 2018/0091535 A1 | 3/2018 | Chrosziel |
| 2018/0091536 A1 | 3/2018 | Chrosziel et al. |
| 2018/0157835 A1 | 6/2018 | Nos |
| 2018/0173872 A1 | 6/2018 | Lam et al. |
| 2018/0173873 A1 | 6/2018 | Hassforther et al. |
| 2018/0176234 A1 | 6/2018 | Kunz et al. |
| 2018/0176235 A1 | 6/2018 | Lam et al. |
| 2018/0176238 A1 | 6/2018 | Nos et al. |
| 2018/0234447 A1 | 8/2018 | Mueen |
| 2019/0005423 A1 | 1/2019 | Pritzkau et al. |
| 2019/0007435 A1 | 1/2019 | Pritzkau et al. |

OTHER PUBLICATIONS

Final Office Action issued in U.S. Appl. No. 15/381,567 dated May 22, 2019, 28 pages.
Final Office Action issued in U.S. Appl. No. 15/370,084 dated Feb. 4, 2019, 16 pages.
Final Office Action issued in U.S. Appl. No. 15/274,693 dated Feb. 11, 2019, 19 pages.
Non-Final Office Action issued in U.S. Appl. No. 15/274,569 dated Mar. 22, 2019, 11 pages.
Non-Final Office Action issued in U.S. Appl. No. 15/216,046 dated Apr. 29, 2019, 23 pages.
Non-Final Office Action issued in U.S. Appl. No. 15/246,053 dated May 17, 2019, 28 pages.
Final office action issued in U.S. Appl. No. 15/847,478 dated Nov. 25, 2019, 14 pages.
U.S. Office Action in related U.S. Appl. No. 15/383,771 dated Jul. 5, 2019, 16 pages.
Office Action in related U.S. Appl. No. 15/216,201 dated Mar. 7, 2018; 14 pages.
Office Action in related U.S. Appl. No. 15/274,569 dated Apr. 16, 2018; 11 pages.
Non-final office action issued in U.S. Appl. No. 15/381,567 dated Oct. 7, 2019, 17 pages.
Office Action issued in U.S. Appl. No. 15/216,046 dated Aug. 21, 2019, 23 pages.
Non-Final Office Action issued in U.S. Appl. No. 15/639,863 dated Jun. 24, 2019, 37 pages.
Schumacher, "An effective way to bring Sap Security Notes under control," Virtual Forge GmbH, Feb. 2017, https://blog.virtualforge.com/en/an-effective-way-to-bring-sap-security-notes-under-control, 4 pages.
U.S. Office Action in related U.S. Appl. No. 15/274,693 dated Jul. 26, 2018, 14 pages.
U.S. Office Action in related U.S. Appl. No. 15/370,084 dated Aug. 27, 2018, 14 pages.
U.S. Office Action in related U.S. Appl. No. 15/383,771 dated Aug. 3, 2018, 12 pages.
U.S. Office Action in related U.S. Appl. No. 15/216201 dated Jul. 20, 2018, 15 pages
U.S. Office Action in related U.S. Appl. No. 15/246,053 dated May 21, 2018, 14 pages.
U.S. Office Action in related U.S. Appl. No. 15/246,053 dated Sep. 24, 2018, 14 pages
U.S. Office Action in related U.S. Appl. No. 15/253,438 dated Sep. 19, 2018, 17 pages.
U.S. Office Action in related U.S. Appl. No. 15/274,569 dated Nov. 14, 2018, 11 pages.
U.S. Office Action in related U.S. Appl. No. 15/380,379 dated Jul. 19, 2018, 9 pages.
U.S. Office Action in related U.S. Appl. No. 15/380,450 dated Aug. 27, 2018, 19 pages
U.S. Office Action in related U.S. Appl. No. 15/380,450 dated Jan. 23, 2019, 21 pages.
U.S. Office Action in related U.S. Appl. No. 15/380,450 dated Nov. 2, 2018, 19 pages.
U.S. Office Action in related U.S. Appl. No. 15/381,567 dated Nov. 2, 2018, 17 pages.
U.S. Office Action in related U.S. Appl. No. 15/383,771 dated Jan. 23, 2019, 14 pages.

* cited by examiner

FIG. 11

| | | | | AVAILABLE INVESTIGATIONS | | | | |
|---|---|---|---|---|---|---|---|---|
| NUMBER | DESCRIPTION | SEVERITY | MANAGEMENT VISIBILITY | STATUS | ATTACK | CREATION DATE | CREATED BY | PROCESSOR |
| 259 | TEST13 | MEDIUM | NOT NEEDED | OPEN | | THU MAR 02 2017 14:19:18 GMT+0100 (W. EUROPE STANDARD TIME) | LUOLING | |
| 258 | TEST12 | MEDIUM | NOT NEEDED | OPEN | | THU MAR 02 2017 14:18:34 GMT+0100 (W. EUROPE STANDARD TIME) | LUOLING | |
| 257 | TEST11 | MEDIUM | NOT NEEDED | OPEN | | THU MAR 02 2017 14:17:45 GMT+0100 (W. EUROPE STANDARD TIME) | LUOLING | |
| 256 | TEST1 | MEDIUM | NOT NEEDED | OPEN | | THU MAR 02 2017 10:26:42 GMT+0100 (W. EUROPE STANDARD TIME) | LUOLING | |
| 255 | TEST | MEDIUM | NOT NEEDED | OPEN | | THU MAR 02 2017 10:25:46 GMT+0100 (W. EUROPE STANDARD TIME) | LUOLING | |
| 254 | INV TEST | VERY HIGH | NOT NEEDED | IN PROCESS | SUSPECTED | THU MAR 01 2017 13:15:54 GMT+0100 (W. EUROPE STANDARD TIME) | DINKOWAH | DINKOWAH |
| 253 | INV TEST | VERY HIGH | NOT NEEDED | IN PROCESS | SUSPECTED | THU MAR 01 2017 13:15:38 GMT+0100 (W. EUROPE STANDARD TIME) | DINKOWAH | DINKOWAH |
| 252 | KPOK | VERY HIGH | NOT NEEDED | OPEN | YES | THU MAR 01 2017 09:55:12 GMT+0100 (W. EUROPE STANDARD TIME) | DINKOWAH | DINKOWAH |
| 251 | KPOK | VERY HIGH | NOT NEEDED | OPEN | YES | THU MAR 01 2017 09:55:10 GMT+0100 (W. EUROPE STANDARD TIME) | DINKOWAH | DINKOWAH |
| 250 | KPOK | VERY HIGH | NOT NEEDED | OPEN | YES | THU MAR 01 2017 09:54:17 GMT+0100 (W. EUROPE STANDARD TIME) | DINKOWAH | DINKOWAH |
| 249 | KPOOP | VERY HIGH | NOT NEEDED | IN PROCESS | NO | THU MAR 01 2017 09:53:56 GMT+0100 (W. EUROPE STANDARD TIME) | DINKOWAH | DINKOWAH |
| 248 | KPOOP | VERY HIGH | NOT NEEDED | IN PROCESS | NO | THU MAR 01 2017 09:53:51 GMT+0100 (W. EUROPE STANDARD TIME) | DINKOWAH | DINKOWAH |
| 247 | TEST | MEDIUM | NOT NEEDED | OPEN | | THU MAR 01 2017 09:53:07 GMT+0100 (W. EUROPE STANDARD TIME) | LUOLING | |
| 246 | GHJGHJGHJ | VERY HIGH | NOT NEEDED | OPEN | | THU MAR 01 2017 09:36:57 GMT+0100 (W. EUROPE STANDARD TIME) | DINKOWAH | DINKOWAH |
| 245 | TEST | MEDIUM | NOT NEEDED | OPEN | | THU MAR 01 2017 09:29:17 GMT+0100 (W. EUROPE STANDARD TIME) | LUOLING | |
| 244 | TEST | MEDIUM | NOT NEEDED | OPEN | | THU MAR 01 2017 09:24:52 GMT+0100 (W. EUROPE STANDARD TIME) | LUOLING | |

FIG. 12

ANALYSIS OF COMPLEX RELATIONSHIPS AMONG INFORMATION TECHNOLOGY SECURITY-RELEVANT ENTITIES USING A NETWORK GRAPH

CROSS-REFERENCE TO RELATED APPLICATION

This application is a co-pending application of and filed in conjunction with U.S. application Ser. No. 15/847,478, filed on Dec. 19, 2017 entitled "DISPLAYING A SERIES OF EVENTS ALONG A TIME AXIS IN ENTERPRISE THREAT DETECTION", the entire contents of each and as a whole, are incorporated herein by reference.

BACKGROUND

Enterprise threat detection (ETD) typically collects and stores a large amount/large sets of real-time log data (often referred to as "big data") associated with Information Technology (IT) security. The log data can be categorized into various heterogeneous Entities, such as computing systems, users, servers, proxies, clients, firewalls, Internet Protocol (IP) address, host name, Media Access Control (MAC) address, and events (or "Events"). An Entity associated with an Event can also act with a certain assigned role(s) (for example, administrator, developer, and general user). Accordingly, some Entities can be considered to be related with each other.

The log data can be analyzed computationally using forensic-type data analysis tools to identify suspicious behavior in revealed patterns, trends, interactions, and associations, especially those relating to ETD-type behavior. Appropriate responses can then be taken if malicious behavior is suspected or identified. Currently, ETD can either list all raw log-related data in a table-like list or show few Entities with their associated attributes (or properties). It is difficult or impossible to determine relationships among Entities as well as roles the Entities play in interesting events.

SUMMARY

The present disclosure describes analysis of complex relationships among Information Technology (IT) security-relevant Entities using a network graph.

In an implementation, a filter is selected from one or more filters defined for an ETD Network Graph. Events are fetched from the selected log files based on the selected filter and entities identified based on the fetched Events. Relationships are determined between the identified entities, and the determined relationships and identified entities are displayed in the ETD Network Graph. An identified entity is selected to filter data in an ETD Event Series Chart. An Event is selected in the ETD Event Series Chart to display Event Attributes in an Event Attribute Dialog. An Event Attribute is selected in the Event Attribute Dialog to filter Events in the ETD Event Series Chart.

Implementations of the described subject matter, including the previously described implementation, can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented in particular implementations, so as to realize one or more of the following advantages. First, the described technique permits determination of relationships among Entities as well as roles the Entities play with respect to interesting Events. An interconnected Enterprise Threat Detection (ETD) Network Graph can be built to visualize related Entities-of-interest along with relationship interconnections in a Graphical User Interface (GUI). Second, during a forensic investigation, the ETD Network Graph permits an ETD investigator to have a holistic, human-comprehensible "whole picture"-type overview of an observed computing system landscape with respect to the Entities-of-interest. Third, the size or color of displayed Entities can be used to represent certain attributes associated with the displayed Entities. If a relationship exists between two Entities, a line/arrow representing the relationship can be drawn from an initiator/actor Entity to a receiver/target Entity. In some implementations, an additional line/arrow can be used if necessary. Fourth, GUI tooltips can be used to show attributes of Entities or relationships (such as, on a mouseover-type GUI event). Fifth, selecting an Entity in the ETD Network Graph can take a user to an ETD Event Series Chart for analysis of Events associated with the selected Entity.

The details of one or more implementations of the subject matter of this specification are set forth in the Detailed Description, the Claims, and the accompanying drawings. Other features, aspects, and advantages of the subject matter will become apparent to those of ordinary skill in the art from the Detailed Description, the Claims, and the accompanying drawings.

DESCRIPTION OF DRAWINGS

FIG. 11 is a screenshot illustrating an example Available Investigations dialog, according to an implementation of the present disclosure.

FIG. 12 is a screenshot illustrating an example Start Investigations dialog, according to an implementation of the present disclosure.

Like reference numbers and designations in the various drawings indicate like elements.

DETAILED DESCRIPTION

Figure 1:
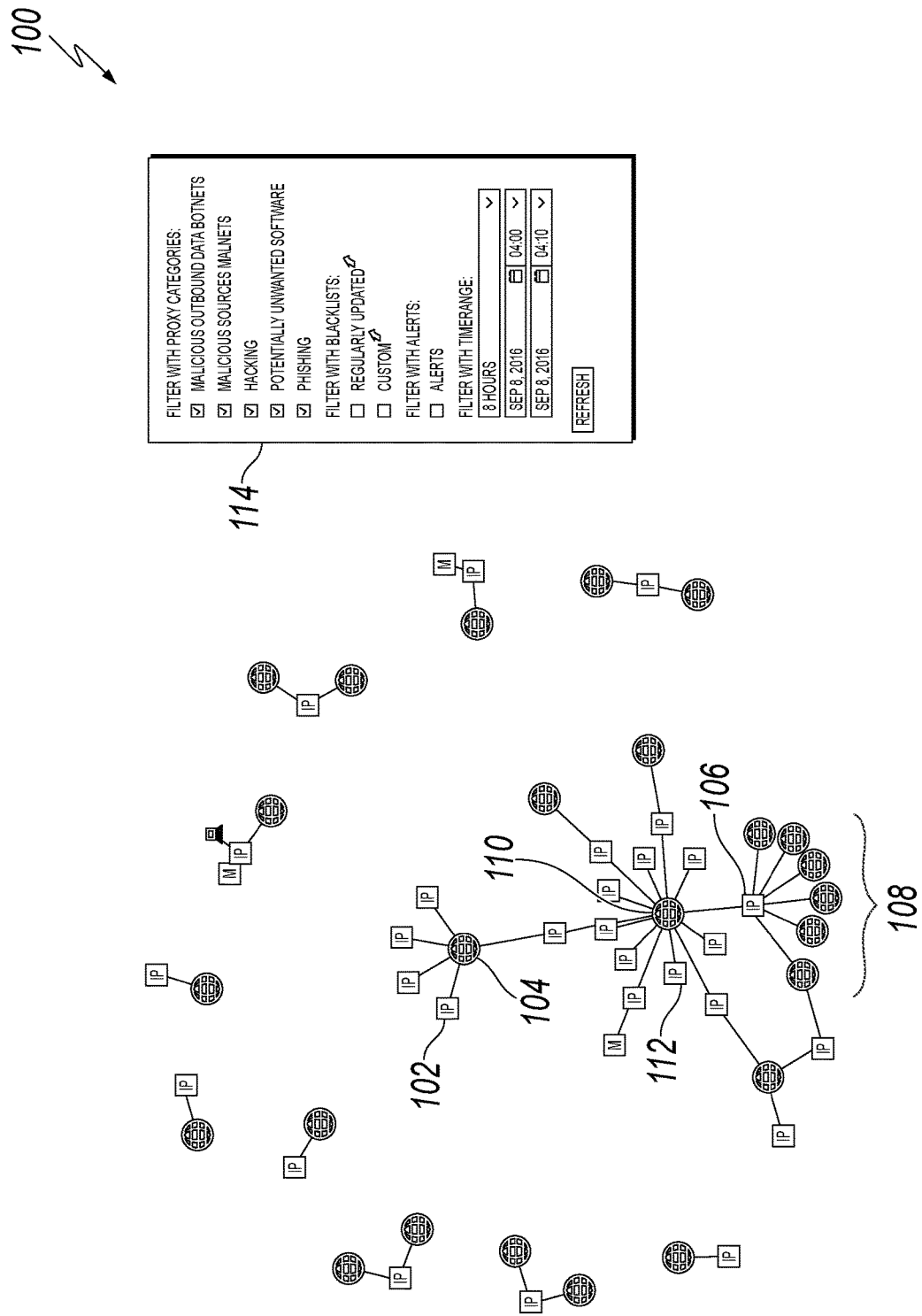
FIG. 1 is a screenshot of an Enterprise Threat Detection (ETD) Network Graph illustrating an example proxy scenario implementation, according to an implementation of the present disclosure.

The following detailed description describes analysis of complex relationships among Information Technology (IT) security-relevant Entities using a network graph, and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

Enterprise threat detection (ETD) typically collects and stores a large amount/large sets of real-time log data (often referred to as "big data") associated with IT security. The log data can be categorized into various heterogeneous Entities, such as computing systems, users, servers, proxies, clients, firewalls, Internet Protocol (IP) address, host name, Media Access Control (MAC) address, and an event (or "Event"). An Entity associated with an Event can also act with a certain assigned role(s) (for example, administrator, developer, and general user). Accordingly, some Entities can be considered to be related with each other.

The log data can be analyzed computationally using forensic-type data analysis tools to identify suspicious behavior in revealed patterns, trends, interactions, and associations, especially those relating to ETD-type behavior. Appropriate responses can then be taken if malicious behavior is suspected or identified. Currently, ETD can either list all raw log-related data in a table-like list or show few Entities with their associated attributes (or properties). It is difficult or impossible to determine relationships (let alone complex relationships) among Entities as well as roles the Entities play in interesting events.

The described technique describes building an interconnected ETD Network Graph visualizing related Entities-of-interest along with relationship interconnections in a Graphical User Interface (GUI). During a forensic investigation, the ETD Network Graph permits an ETD investigator to have a holistic "whole picture"-type overview of an observed computing system landscape with respect to the Entities-of-interest. The Entities-of-interest and Entity relationship interconnections are displayed in a human-comprehensible manner. For example and in some implementations, the ETD Network Graph displays Entities using predefined shapes or icons. The size or color of displayed Entities can be used to represent certain attributes. If a relationship exists between two Entities, a line/arrow representing the relationship can be drawn from an initiator/actor Entity to a receiver/target Entity. In some implementations, an additional line/arrow can be used if necessary.

In some implementations, determined prominent Entities can be configured to be shown by default or always. For example, prominent Entities can include:

User: mainly an actor who triggers the security related events,

Event: what type of action the user has done,

IP Address: where an action happened, and

MAC Address: uniquely identifying a computing device.

In some implementations, GUI tooltips can be used to show attributes of Entities or relationships (such as, on a mouseover-type GUI event). For example, a tooltip can display data associated with a particular Event (for example, at a particular timestamp.

The ETD Network Graph not only displays IT security Entities-of-interest together, but also highlights contextual information associated with the Entities-of-interest. For example, particular contexts can be illustrated by links/relationships between different Entities that represent:

Who acted at whom/what,

At when,

In which computing system, and

With which device.

The contextual information can be presented on a GUI with a single operation (for example, a single mouse-click-type GUI event). With the contextual information in one location, important questions related to ETD can be answered. For example, turning to FIG. 1, FIG. 1 is a screenshot of an ETD Network Graph 100 illustrating an example proxy scenario implementation, according to an implementation of the present disclosure. In FIG. 1, a Client computing devices (for example, 102) is illustrated accessing websites (for example, using a Uniform Resource Locator (URL)) through a Proxy computing device (for example, 104).

In the example of FIG. 1, ETD-type questions can be more readily answered, such as:

Which computing device has accessed more than one suspicious website (for example, computing device 106 accessing different suspicious websites through various proxy computing devices 108), Which websites are heavily accessed (for example, proxy computing device 110 could serve as a proxy computing device for a popular social media website for multiple connected Client computing devices, such as 112), Which IP address has been assigned to multiple computing devices (for example, identified with unique MAC addresses), and Which device has no host name assigned (for example, indicating a Dynamic Host Configuration Protocol (DHCP) malfunction).

In some implementations, the ETD Network Graph 100 can provide a Configuration dialog 114 to configure Entities and relationships displayed on the ETD Network Graph 100. Example Configuration Dialog 114 shows filter options, such as: "Filter with Proxy Categories", "Filter with Blacklists", "Filter with Alerts", and "Filter with Timerange", and a Refresh GUI control when changes are made to the Configuration Dialog 114. As will be apparent to those of ordinary skill in the art, the illustrated Configuration Dialog 114 is only one possible implementation. Other configuration options consistent with this disclosure are also considered to be within the scope of this disclosure.

Figure 2:
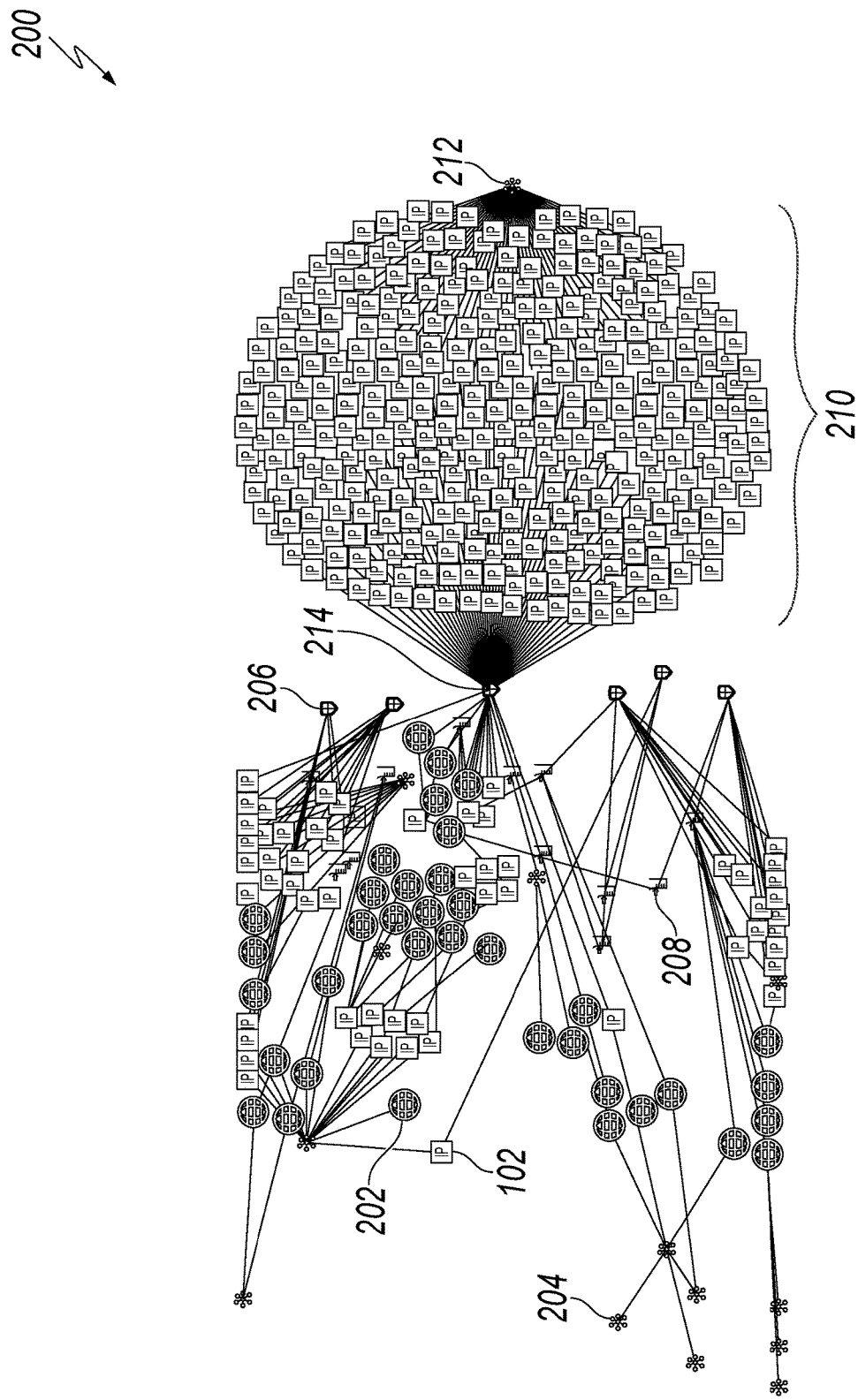
FIG. 2 is a screenshot of an ETD Network Graph illustrating an example firewall scenario implementation, according to an implementation of the present disclosure.

Turning to FIG. 2, FIG. 2 is a screenshot of an ETD Network Graph 200 illustrating an example firewall scenario implementation, according to an implementation of the present disclosure. FIG. 2 shows various Client computing devices 102 making requests of a target computing system 202 (for example, a webserver or a proxy server 104 as in FIG. 1). In FIG. 2, the Client computing devices 102 and Target computing systems 202 are connected to networking Subnet computing systems 204 and Firewall computing systems 206 executing one or more Firewall Rules 208.

In particular, FIG. 2 illustrates some interesting ETD aspects:

Most of the Client computing devices 102 (for example, at 210) belong to the same Subnet computing system 212 and share the same Firewall computing system 214, which indicates a consistent configuration of the various displayed computing systems. Misconfiguration of computing systems can be visually identified for further analysis, and Accesses to protected/safe Subnet computing systems (for example, at 214) is visually distinguishable from accesses to other Subnet computing systems (which may or may not be protected/safe). Additionally, particular Client computing systems accessing a particular Subnet computing system can be identified.

Figure 3:
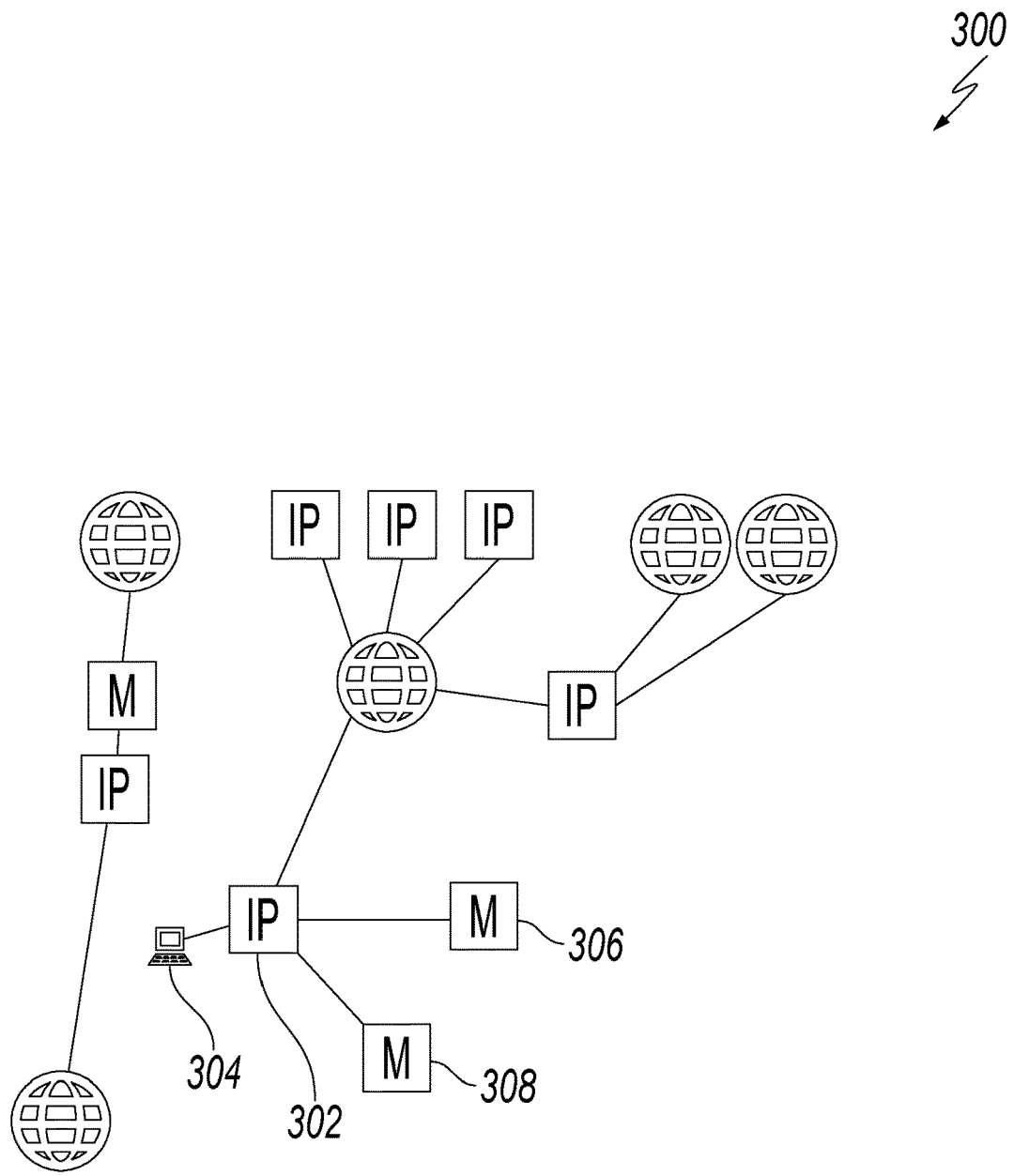
FIG. 3 is a screenshot of a portion of an ETD Network Graph illustrating an example of a single IP address assigned to two separate computing devices, according to an implementation of the present disclosure.

FIG. 3 is a screenshot of a portion of an ETD Network Graph 300 illustrating an example of a single IP address assigned to two separate computing devices, according to an implementation of the present disclosure. As illustrated in FIG. 3, IP address 302 (associated with a Client computing device identified by graphical icon 304—such as, a Client computing device 102 in FIG. 1) has been assigned to two physical computing devices 306 and 308 (identified by a boxed "M"-type icon representing a particular MAC address per physical computing device (for example, mobile phone, laptop, and tablet computer)). FIG. 3 permits, for example, determining a misconfiguration/failure of a network (such as, a problem with a DHCP server or a Network Interface Card (NIC)).

Figure 4:
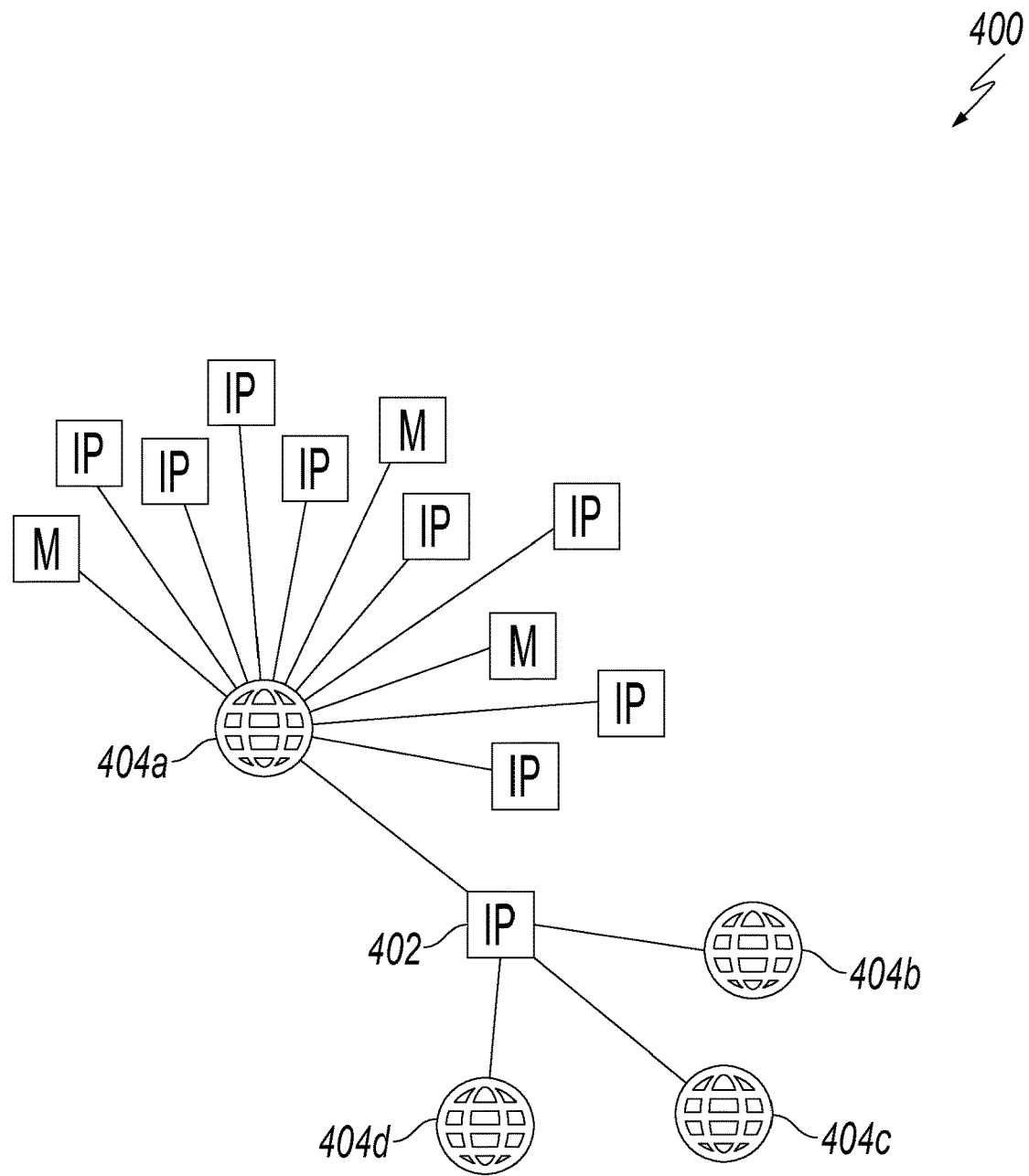
FIG. 4 is a screenshot of a portion of an ETD Network Graph illustrating an example of a single IP address accessing four different websites, according to an implementation of the present disclosure.

FIG. 4 is a screenshot of a portion of an ETD Network Graph 400 illustrating an example of a single IP address accessing four different websites, according to an implementation of the present disclosure. As illustrated in FIG. 4, IP address 402 (associated with a Client computing device, such as, a Client computing device 102 as in FIG. 1) has accessed four different websites 404a, 404b, 404c, 404d, one or more of which may be associated with suspicious activity. FIG. 4 permits, for example, quick visual identification of which IP addresses accessed suspected suspicious websites.

Figure 5A:
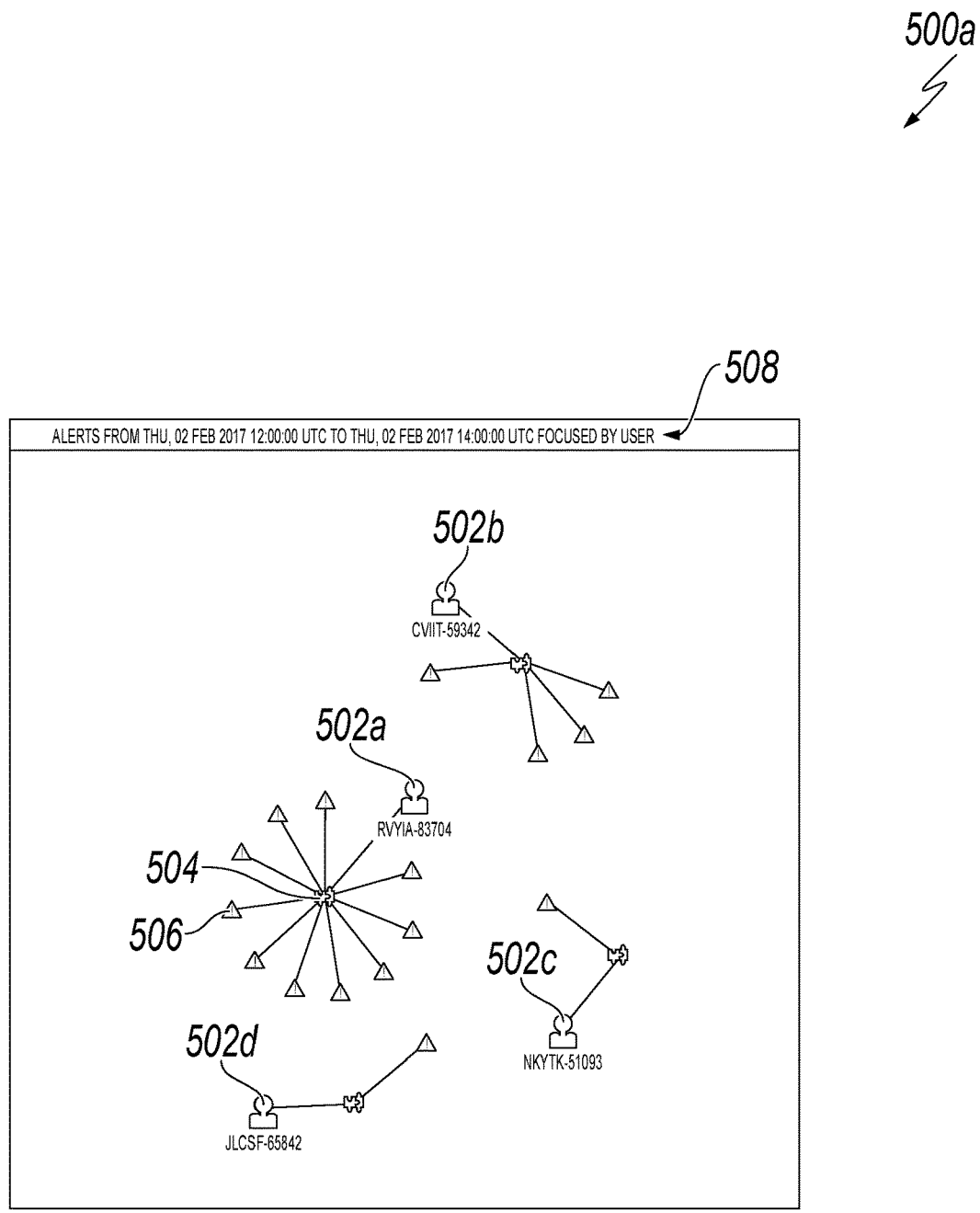
FIG. 5A is a screenshot of a portion of an ETD Network Graph illustrating an example of ETD Alerts associated with four distinct Users, according to an implementation of the present disclosure.

FIG. 5A is a screenshot of a portion of an ETD Network Graph 500a illustrating an example of ETD Alerts associated with four distinct Users 502a, 502b, 502c, and 502d, according to an implementation of the present disclosure. As illustrated in FIG. 5A, User 502a (here, "RVYIA-83704") is shown with a relationship to an ETD Pattern 504 and multiple Alerts 502 related to User 502a based on ETD Pattern 504. Among the central functionalities of ETD is the use of ETD Patterns to evaluate extracted Events from ETD log data. ETD Patterns (for example, particular configured rules, thresholds, and filters) specify what Event characteristics (such as types or numbers—for example, if a certain number of failed logon Events for a particular User are observed in a particular computing system) cause an Alert to be raised by the ETD system. In ETD systems, the ETD Patterns are executed against ETD log data and one or more Alerts generated if defined criteria associated with a particular ETD Pattern is satisfied.

As illustrated in FIG. 5A, the displayed ETD Network Graph 500a displays Alerts associated with a particular User and ETD Pattern (here, all ETD Patterns are ETD Pattern 504) according to filter information 508, which specifies that the ETD Network Graph is associated with a particular timeframe (that is, "Thu, 2 Feb. 2017 12:00:00 UTC to Thu, 2 Feb. 2017 14:00:00 UTC") and "Focused by User". Of the available ETD log data, the displayed ETD Network Graph 500a shows relationships of data according to at least User, ETD Pattern, timeframe selections.

In some implementations, the particular relationship clusters around each User can be manipulated on the GUI of the ETD Network Graph 500a. For example, each relationship cluster could be moved within the GUI (such as, with a drag-and-drop GUI-type operation). Other GUI-type operations are also possible. For example, a User can select one or more of Alerts 506 in the ETD Network Graph 500a (such as, by a click or click-and-select GUI-type operation) for further investigation/analysis (such as, with contextual menus displayed on a right-click or other GUI-type operation). In some implementations, further investigation/analysis can include either starting a new investigation or adding to an existing investigation (for example, refer to FIG. 11 and associated description).

Figure 5B:
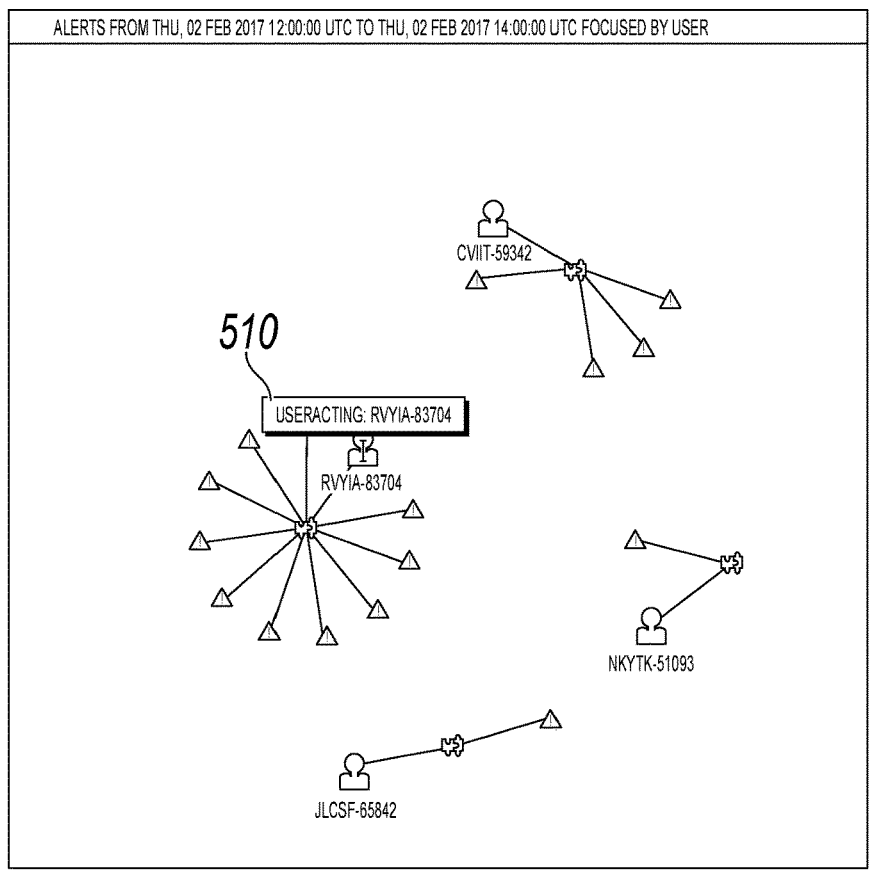
FIG. 5B is a screenshot of a portion of the ETD Network Graph of FIG. 5A illustrating an example of a displayed tooltip associated with a User, according to an implementation of the present disclosure.

In some implementations, graphical tooltips can be made available for any displayed graphical element (for example, icon, element, or widget) displayed in the ETD Network Graph 500a. For example, a tooltip can be displayed if a User hovers a mouse pointer over a graphical element representing a particular Alert, ETD Pattern or User. Referring to FIG. 5B, FIG. 5B is a screenshot of a portion of the ETD Network Graph of FIG. 5A illustrating an example of a displayed tooltip associated with a User, according to an implementation of the present disclosure. In FIG. 5B, the tooltip 510 provides data that "UserActing: RVYIA-83704", meaning that the acting User with respect to the ETD log data that the displayed Alerts are based on is user RVYIA-83704. As another example, a tooltip (not illustrated) associated with an Alert (such as, Alert 506 of FIG. 5A), can display Alert-specific data in a displayed tooltip.

If a User wishes to see more detailed Event-related data, the user can choose to enter into an Event Series Chart GUI interface. For example, a user can select the graphical element representing a User 502a ("RVYIA-83704") to enter into the Event Series Chart to see Event data filtered by User 502*a* or a particular Alert to enter into the Event Series Chart to see Event data filtered by the particular Alert.

Figure 6:
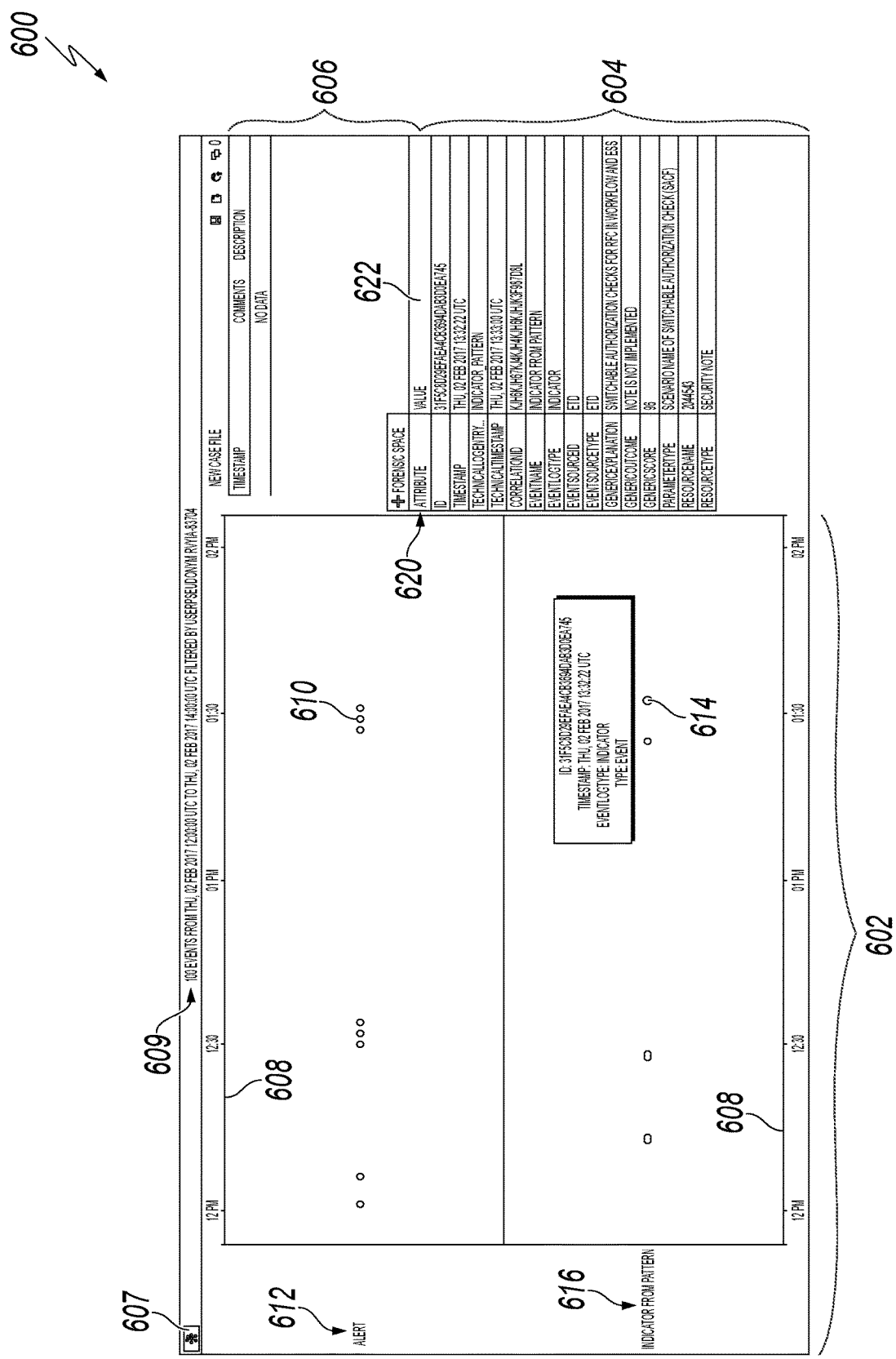
FIG. 6 is a screenshot of an ETD Event Series Graphical User Interface (GUI), according to an implementation of the present disclosure.

Turning to FIG. 6, FIG. 6 is a screenshot of an ETD Event Series GUI 600, according to an implementation of the present disclosure. FIG. 6 includes an Event Series Chart 602, an Event Attribute dialog 604, New Case File list 606, and ETD Network Graph View button 607.

In FIG. 6, Events associated with User 502*a* are displayed in the Event Series Chart 602 in a linear manner (for example, in horizontal "Lanes" that share the same time axis and are associated with particular Event types). Accordingly, it is easy to recognize Event clusters where Events may be congested or spot a time period when nothing has happened (that is, no Events have occurred).

In some implementations, each Event in the Event Series Chart of FIG. 6 can be represented with a graphical indicator—a point/shape (for example, a circle, square, or triangle)—located relative to a time axis at a position corresponding to its individual timestamp. Additionally, shape, color, and size of an Event representation can be varied based on particular attributes associated with the particular Event. Various patterns of Events along the time axis can also reveal valuable information to help trace suspicious activities.

The Event Series Chart 602 can enhance an ETD experience for a user in a GUI by permitting: 1) zooming to obtain either a detailed view of a particular timestamp or an overview of a timeframe along the time axis; 2) panning of a series of Events along the time axis (for example, by drag-and-drop operations); 3) filtering by Event attributes; 4) use of tooltips to display attributes of an Event (for example, on a mouseover-type GUI event); and 5) display of the time axis on both the top and bottom of the GUI to ensure that at least one time axis is visible to a user.

In some implementations, Event attributes can be used as filter. For example, a time filter allows a user to specify in which timeframe/period that Events should be displayed in the GUI. Moreover, zooming and panning can change a user's perspectives to view Events. For example, in zooming (that is, in/out) can reduce or enlarge a particular timeframe by reducing or expanding the timeframe (for example, from 8 to 4 hours) to provide a rougher or a more detailed view, respectively, or vice versa. In panning, times associated with a particular timeframe can modified. As a particular example, if the timeframe is from 0500 to 1100 (6 hours), panning can change the boundary times of the 6 hour timeframe to 0200 to 0800.

The Event Series Chart 602 includes two identical Time Axes 608 (from "12 PM" to sometime past "02 PM") at the top and bottom of the Event Series Chart 602. As previously mentioned, the illustrated Event Series Chart 602 displays Events in horizontal Lanes (corresponding to an Event type attribute) that share the same time axis 608.

Filter information 609 is consistent (that is, date and time) with the filter information 508 in FIG. 5A. Filter information 609 also states that 100 events are displayed in the Event Series Chart 602 that are "Filtered by UserPseudonym RVYIA-83704", which is consistent with the selection of User 502*a* in FIG. 5A to act as a filter.

Events are displayed in the Event Series Chart 602 as circular dots (for example, Event 610) associated with Event type 612 ("Alert") and Event 614 associated with Event type 616 ("Indicator From Pattern"). Events associated with Event types 612 and 616 are distributed along the timeframe of the Time Axes 608 corresponding to individual Event timestamp attribute values.

An interpretation of the Event Series Chart 602 can be that while some ETD log data results in generation of "Indicator From Pattern"-type Events, not all Events that meet configured rules, thresholds, or filters associated with a particular ETD Pattern associated with the "Indicator From Pattern" Event type 616 to generate an "Indicator From Pattern" Event, necessarily rise to a required threshold required to generate an "Alert"-type Event 612.

In some implementations, the Event Series Chart 602 can be configured to provide functionality to zoom in/out with respect to the timeframe of the displayed Time Axes 608. For example, the Event Series Chart 602 Time Axes 608 could be zoomed-in upon where a truncated timeframe from 12 PM to 01 PM would be displayed in the same amount of computer display real estate and providing a more detailed view of associated Events. This would have the effect of increasing the space between displayed "Alert"-type Events 612 (for example, Event 610 to make "Alert"-type Events 612 easier to select, hover over for tooltip information, or interact with in any way consistent with this disclosure. In some instances, scrolling of a wheel on a computer-mouse-type interface device or configured +/−zoom-type GUI buttons (not illustrated) could be used to perform the mentioned zoom in/out of the Time Axes 608.

While the Event Series Chart 602 is displayed in a horizontal format, other layouts/implementations are possible. For example, in some implementations, the Event Series Chart 602 can be configured to permit the Event Series Chart 602 to be placed into a vertical or other orientation.

In some implementations, the displayed timeframe of the Event Series Chart 602 can be zoomed (that is, in/out) or panned. For example, a drag-and-drop operation can be used with the Event Series Chart 602 to scroll Time Axes 608 to either increase or decrease the time values with respect to the current timeframe represented by the Time Axes 608. As a particular example, the Time Axes 608 (from "12 PM" to sometime past "02 PM"—somewhat over 2 hours) cam be scrolled backwards in time to reflect a timeframe from "10 AM" to sometime past "12 PM". Some implementations of the Event Series Chart 608 can provide a settings-type dialog to enter time or other values to adjust time values with relation to the Time Axes 608. If the Event Series Chart 602 is zoomed or panned, new Events associated with a new particular timeframe indicated by the Time Axes 608 will be displayed in the Event Series Chart 602. In some implementations, the GUI can be configured to drop The Event Series Chart 602 can be configured to provide functionality permitting display of a graphical tooltip with respect to an Event displayed in the Event Series Chart 602. For example, a User could hover a computer mouse pointer over a displayed Event (for example, Event 610 or 614) to display a tooltip. If a User hovers over Event 614, tooltip 618 (similar to tooltip 510 in FIG. 5B) can be displayed. One or more attributes of Event 614 would then be displayed in the tooltip 618 for review. Here, tooltip 618 provides "Id", "Timestamp", and "EventLogType" attribute information for review. Other implementations can be configured to provide more or less attribute information or different attribute information (for example, depending on Event type, an ETD User's security level, or role).

Event Attribute dialog 604 can be used to display attributes associated with a particular Event. For example, in some implementations, if the graphical indicator representing Event 614 or the tooltip 618 are selected (for example, by a click, click-and-select, or sub-menu GUI-type operation), Attributes 620 of the Event 614 can be displayed. For example, Attributes 620 can include, but are not limited to, "Id", "Timestamp", "EventLogType", "EventSourceId", "EventSourceType", "ParameterType", "ResourceName", and "ResourceType". Selected Events can be highlighted or distinguished of non-selected Events (such as, by enlarging, changing color, or outlining an Event graphical indicator. In some implementations, Attribute Values 622 can be selected (for example, as URLs) in the GUI to act as filters for Events displayed in the Event Series Chart 602 or a ETD Network Graph accessed by selecting the ETD Network Graph View button 607. In some implementations, the Event Attribute Dialog 604 can be cleared by selecting in a clear space in the Event Series Chart 602.

The New Case File List 606 can be used to add data to a "Case File" used for further ETD analysis/investigation. For example, if data is added to a Case File, the current data state associated with the ETD Network Graph and Event Series GUI is saved as a data package that can be recovered and used for later ETD analysis (for example, in ETD forensic tools or in the described GUIs).

Figure 7:
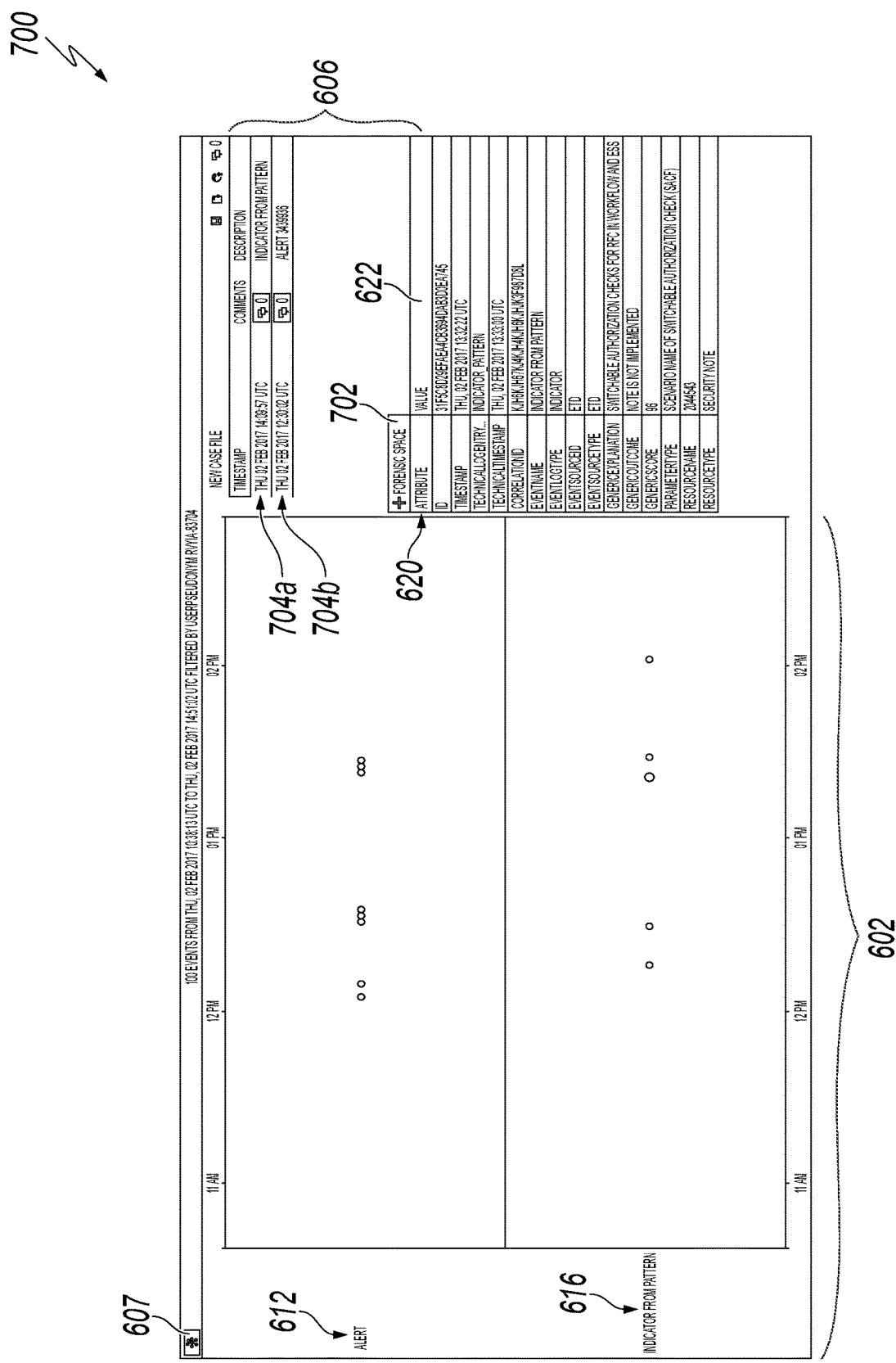
FIG. 7 is a screenshot of the ETD Event Series GUI 600 of FIG. 6 with particular Events added to a New Case File, according to an implementation of the present disclosure.

As a particular example, FIG. 7 is a screenshot of the ETD Event Series Chart 600 of FIG. 6 with particular Events added to a New Case File, according to an implementation of the present disclosure. Once an Event is selected, as described with respect to FIG. 6, a "Forensic Space" GUI button 702 can be selected to add the particular Event to the New Case File List 606 (for example, New Case File entries 704*a* (an Indicator From Pattern Event type 616) and 704*b* (an Alert Event type 612)). ETD Network Graph 700 shows that the ETD Event Series Chart timeframe of FIG. 6 was changed (for example, by zooming out) to 10:38:13 UTC to 14:51:02 UTC on Thu, 2 Feb. 2017.

Continuing the example of FIG. 7, the timeframe can again be changed (not illustrated) in the Event Series Chart 602 to reflect 10:25:34 UTC to 15:03:40 UTC on Thu, 2 Feb. 2017. An Attribute 620 (here, "Generic Explanation" with a value of "Switchable authorization checks for RFC in Workflow and ESS") is also selected as a filter. The ETD Network Graph View button 607 is then selected to return the GUI to an ETD Network Graph.

Figure 8:
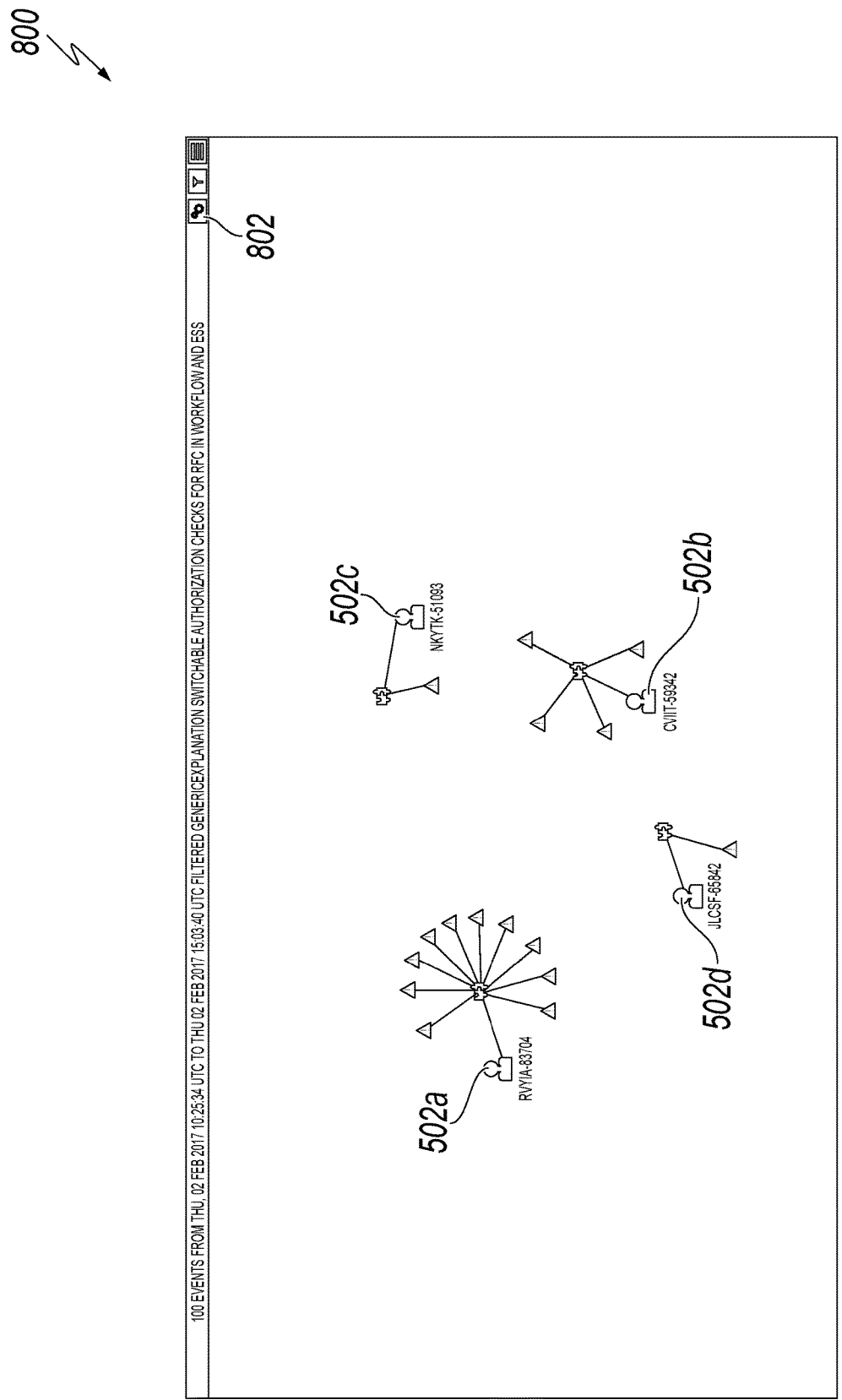
FIG. 8 is a screenshot of a portion of an updated ETD Network Graph illustrating an example of ETD Alerts associated with four distinct Users of FIGS. 5A and 5B, according to an implementation of the present disclosure.

FIG. 8 is a screenshot of a portion of an updated ETD Network Graph 800 illustrating an example of ETD Alerts associated with the four distinct Users 502*a*, 502*b*, 502*c*, and 502*d* of FIGS. 5A and 5B, according to an implementation of the present disclosure. ETD Network Graph 800 shows that the timeframe of ETD Event Series Chart of FIGS. 6 and 7 was changed to 10:25:34 UTC to 15:03:40 UTC on Thu, 2 Feb. 2017. The data in the ETD Network Graph 800 is filtered by selected Attribute 620 (here, "Generic Explanation" with a value of "Switchable authorization checks for RFC in Workflow and ESS"). Configuration button 802 is used to open a Graph Settings dialog.

Figure 9:
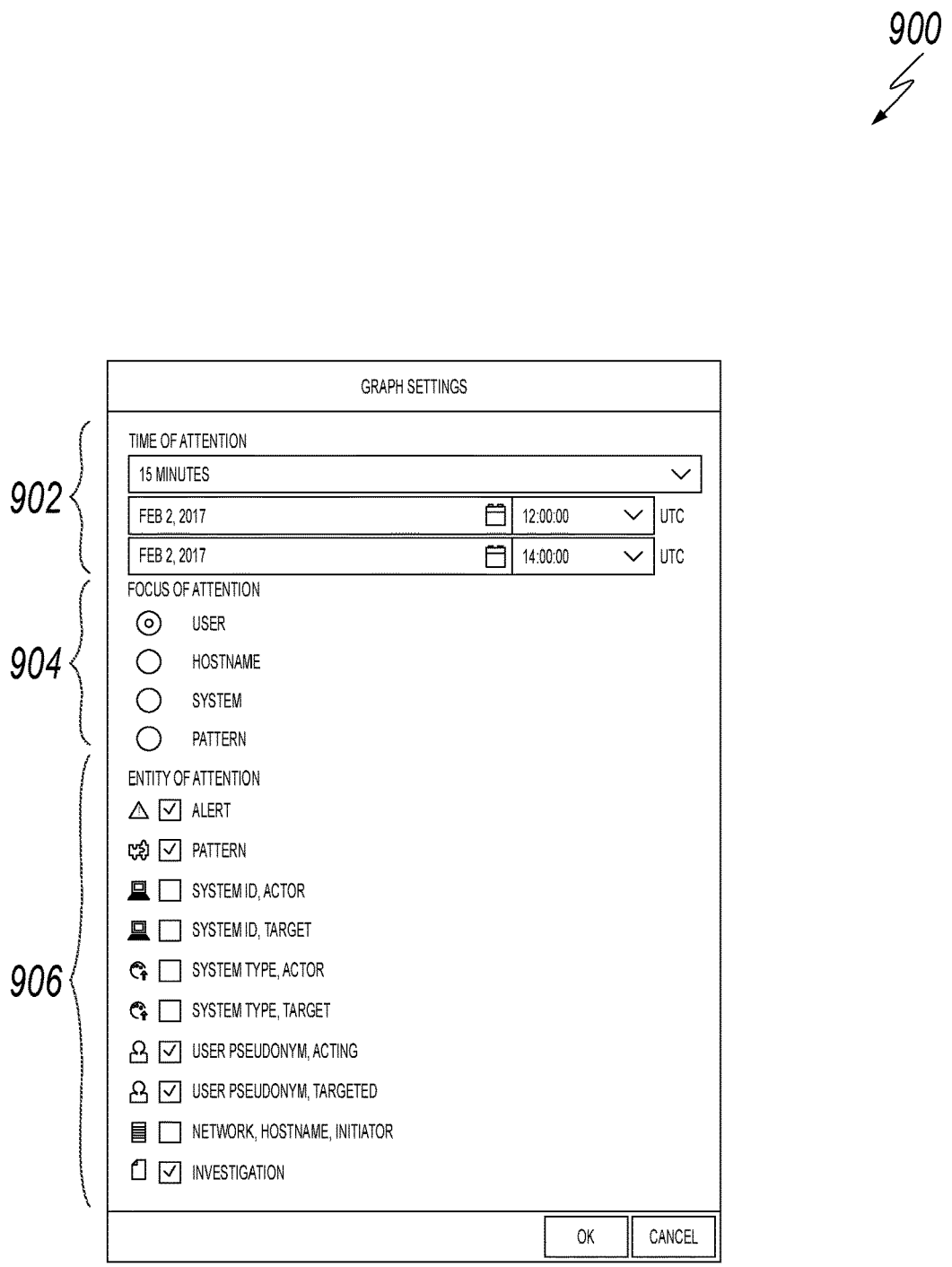
FIG. 9 is a screenshot illustrating an example Graph Settings dialog, according to an implementation of the present disclosure.

Turning to FIG. 9, FIG. 9 is a screenshot illustrating an example Graph Settings dialog 900, according to an implementation of the present disclosure. FIG. 9 contains example graph settings for the ETD Network Graph GUI, including, but not limited to:

Time of Attention 902 (including Timeframe and Start and end date/time data fields),
Focus of Attention 904 (including User, Hostname, System, and Pattern selections), and
Entity of Attention 906 (including Alert; Pattern; System ID, Actor; System ID, Target; System Type, Actor; System Type, Target; User Pseudonym, Acting; User Pseudonym, Targeted; Network, Hostname, Initiator; and Investigation selections).

In some implementations, the value of various settings can be set to default values. For example, for a User selection in the Focus of Attention 904 settings, FIG. 9 illustrates possible default Entity of Attention 906 settings.

Similar to the "User" setting illustrated in FIGS. 5A and 5B, changing the Focus of Attention 904 settings changes the ETD Network Graph in FIG. 8 Hostname, System, or Pattern, shows relationships focused by Hostnames, Systems, or Patterns (as opposed to Users) and ETD Patterns and Alerts. Regardless of the Focus of Attention 904 setting, all illustrated functionality in FIGS. 5A-5B, and 6-8 remains similar apart from possible necessary differences due to the Focus of Attention 904 selection type, as will be understood by those of ordinary skill in the art.

Figure 10A:
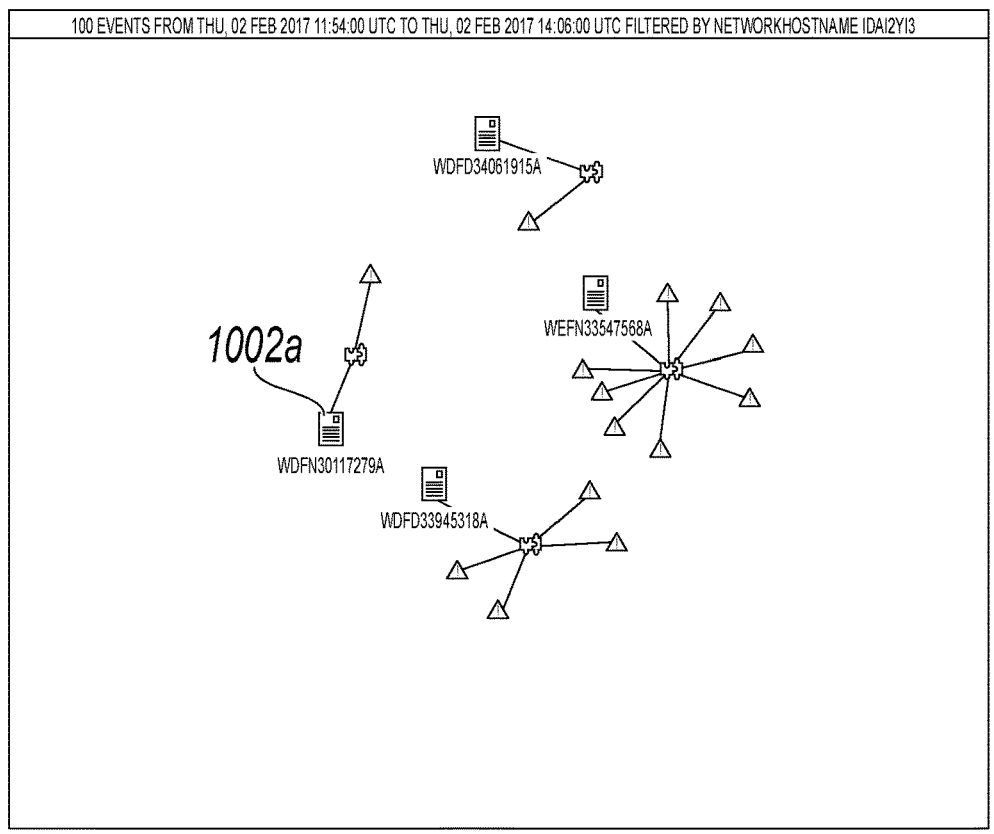
FIGS. 10A, 10B, and 10C are screenshots illustrating example partial Hostname, Pattern, and System ETD Network Graphs according to an implementation of the present disclosure.
Figure 10B:
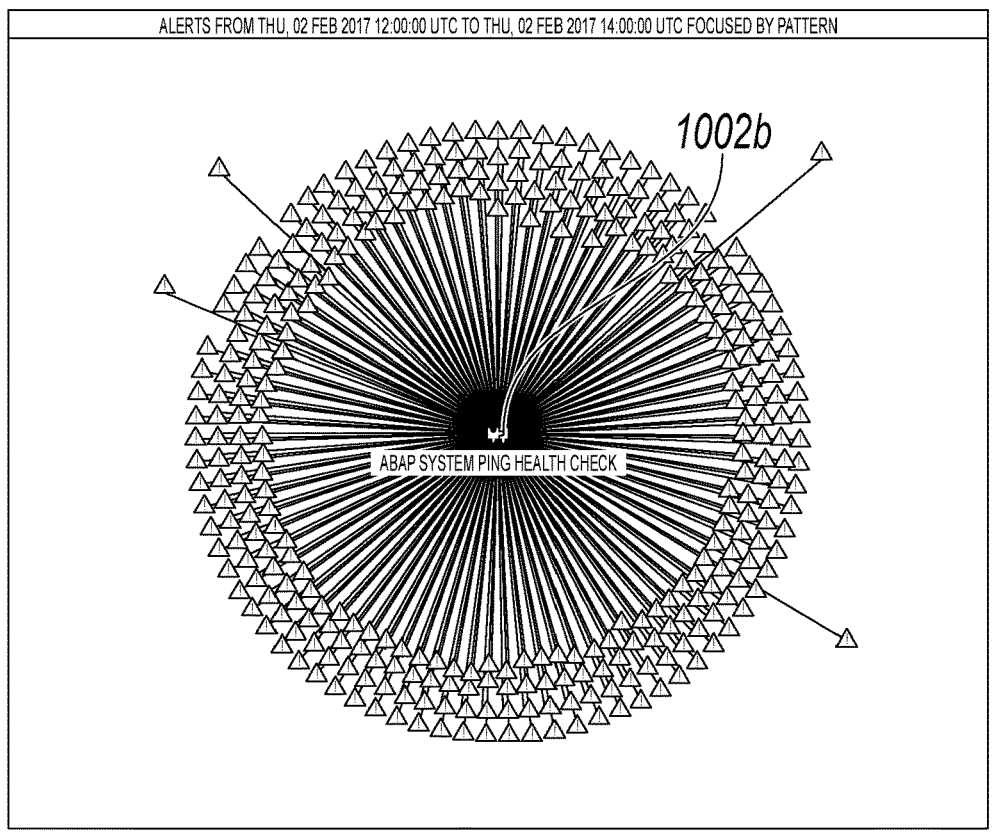
Figure 10C:
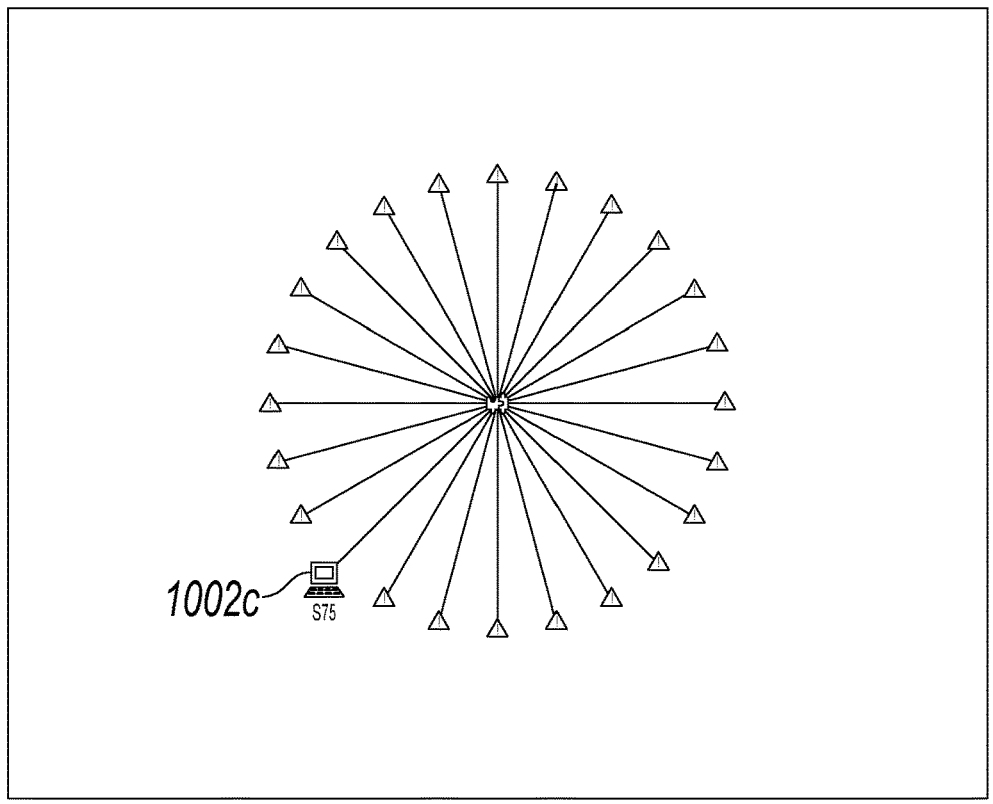

FIGS. 10A, 10B, and 10C are screenshots illustrating example partial Hostname, Pattern, and System ETD Network Graphs 1000*a*, 1000*b*, and 1000*c* respectively, according to an implementation of the present disclosure. As can be seen, the Focus of Attention 904 settings shows different relationships focused by Hostnames (for example, Hostname 1002*a* in FIG. 10A), Patterns (for example, Pattern 1002*b* in FIG. 10B), or Systems (for example, System 1002*c* in FIG. 10C).

FIG. 11 is a screenshot illustrating an example Available Investigations dialog 1100, according to an implementation of the present disclosure. The Available Investigations dialog 1100 lists one or more ETD Investigations (for example, ETD Investigation 1102) and permits adding Alert data to an available ETD Investigation (either "Add and Show Investigation" or "Add and Return" options).

Figure 12:
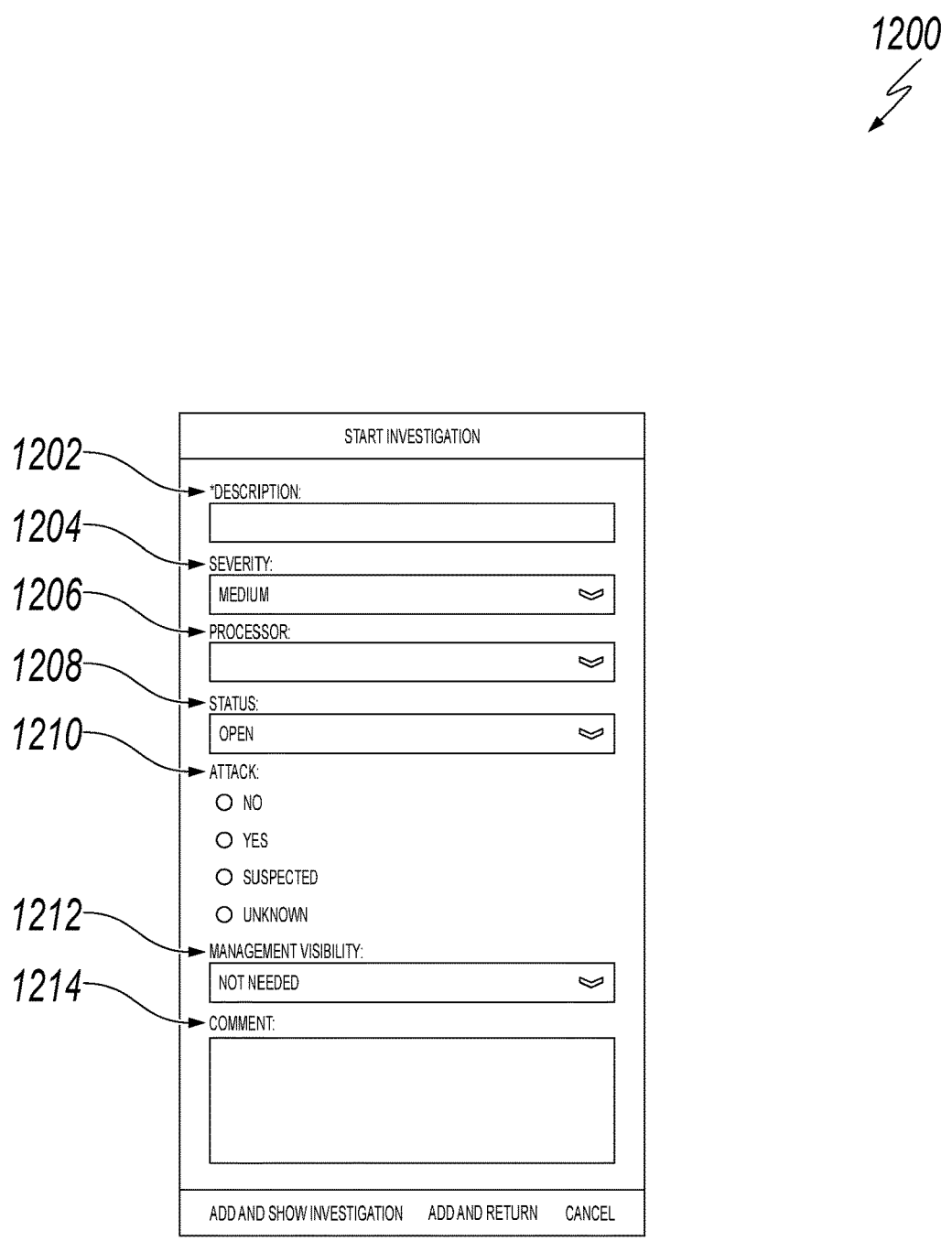

FIG. 12 is a screenshot illustrating an example Start Investigations dialog 1200, according to an implementation of the present disclosure. The Start Investigations dialog 1200 permits a user to start an ETD Investigation using selected Alert data from an ETD Network Graph. For example, the Start Investigations dialog 1200 includes data entry fields for "Description" 1202, "Severity" 1204 (for example, "Very High", "High", "Medium", and "Low"), "Processor" 1206 (for example, an ETD representative), "Status" 1208 (for example, "Open" and "In Progress"), "Attack" 1210 (for example, "No", "Yes", "Suspected", and "Unknown"), "Management Visibility" 1212 (for example, "Not Needed", "For Information", and "For Action"), and "Comment" 1214. The Start Investigations dialog 1200 permits to either add Alert data to a new ETD Investigation (either "Add and Show Investigation" or "Add and Return" options).

In some implementations, adding a new ETD Investigation can also return the user a current ETD Network Graph with a new graph entry representing the added ETD Investigation. Selecting the added ETD Investigation can take the user to one or more Investigation GUIs (not illustrated) that permit analysis of associated Alerts and other data associated with the added ETD Investigation.

In some implementations, a described ETD Event Series Chart or an ETD Network Graph can be configured to send messages, instructions, or other communications to a computer-implemented controller, database, or other computer-implemented system to dynamically initiate control of, control, or cause another computer-implemented system to perform a computer-implemented or other function/operation. For example, operations based on an Event(s) or other data displayed on an ETD Event Series Chart or an ETD Network Graph can be transmitted to cause operations associated with a database to perform storage efficiency, data retrieval, or other operations consistent with this disclosure. In another example, adjusting the timeframe associated with the time axes (for example, time axes 608)—such as zooming in/out or scrolling to an earlier or later timeframe—can automatically result in one or more instructions transmitted from the GUI to trigger requests for data, storage of data, analysis of data, or other operations consistent with this disclosure.

In some instances, transmitted instructions can result in control, operation, modification, enhancement, or other operations with respect to a tangible, real-world piece of computing or other equipment. For example, the described GUIs can send a request to slow or speed up a computer database magnetic/optical disk drive, shut down/activate a computing system, cause a network interface device to disable, throttle, or increase data bandwidth allowed across a network connection, or sound an audible/visual alarm (for example, a mechanical alarm/light emitting device) as a notification of detected malicious behavior(s) with respect to a computing system being monitored/analyze by an ETD system.

Figure 13:
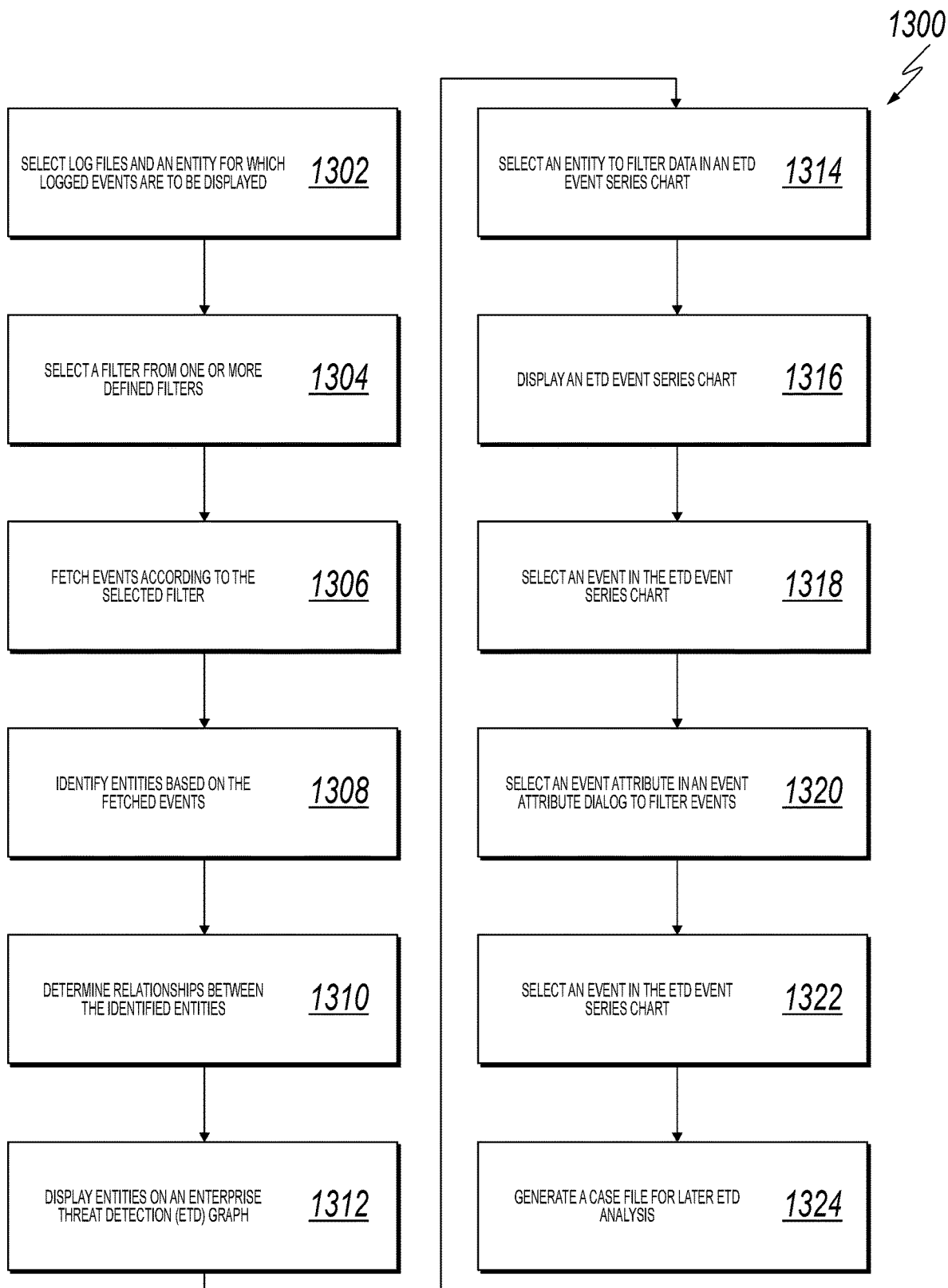
FIG. 13 is a flowchart illustrating an example of a computer-implemented method for analysis of complex relationships among Information Technology (IT) security-relevant Entities using a network graph, according to an implementation of the present disclosure.

FIG. 13 is a flowchart illustrating an example of a computer-implemented method 1300 for analysis of complex relationships among Information Technology (IT) security-relevant Entities using a network graph, according to an implementation of the present disclosure. For clarity of presentation, the description that follows generally describes method 1300 in the context of the other figures in this description. However, it will be understood that method 1300 can be performed, for example, by any system, environment, software, and hardware, or a combination of systems, environments, software, and hardware, as appropriate. In some implementations, various steps of method 1300 can be run in parallel, in combination, in loops, or in any order.

At 1302, particular log files can be selected for ETD analysis. From 1302, method 1300 proceeds to 1304.

At 1304, one or more filters are defined for an ETD Network Graph. For example, a defined filter can include a timeframe, Alert, ETD Pattern, or other value consistent with this disclosure. A defined filter is selected to filter data for the ETD Network Graph. From 1304, method 1300 proceeds to 1306.

At 1306, Events are fetched from the selected log files according to the defined one or more filters. From 1306, method 1300 proceeds to 1308.

At 1308, identify Entities based on the fetched Events. From 1308, method 1300 proceeds to 1310.

At 1310, relationships between the identified Entities are determined. From 1310, method 1300 proceeds to 1312.

At 1312, Entities are displayed (for example, with shapes, icons, and colors) and relationships (for example, lines and curves) on an ETD Network Graph. From 1312, method 1300 proceeds to 1314.

At 1314, an Entity is selected on the ETD Network Graph to filter data in an ETD Event Series Chart. From 1314, method 1300 proceeds to 1316.

At 1316, an ETD Event Series Chart is displayed with Events filtered by the selected Entity. From 1316, method 1300 proceeds to 1318.

At 1318, an Event is selected in the ETD Event Series Chart. Event Attributes for the selected Event are populated in an Event Attribute Dialog. From 1318, method 1300 proceeds to 1320.

At 1320, an Event Attribute value is selected in the Event Attribute Dialog to filter the Events in the ETD Event Series Chart. From 1320, method 1300 proceeds to 1322.

At 1322, an Event is selected in the ETD Event Series Chart. Event Attributes for the selected Event are populated in an Event Attribute Dialog. From 1322, method 1300 proceeds to 1324.

At 1324, a Case File is generated for later ETD analysis. After 1324, method 1300 stops.

Figure 14:
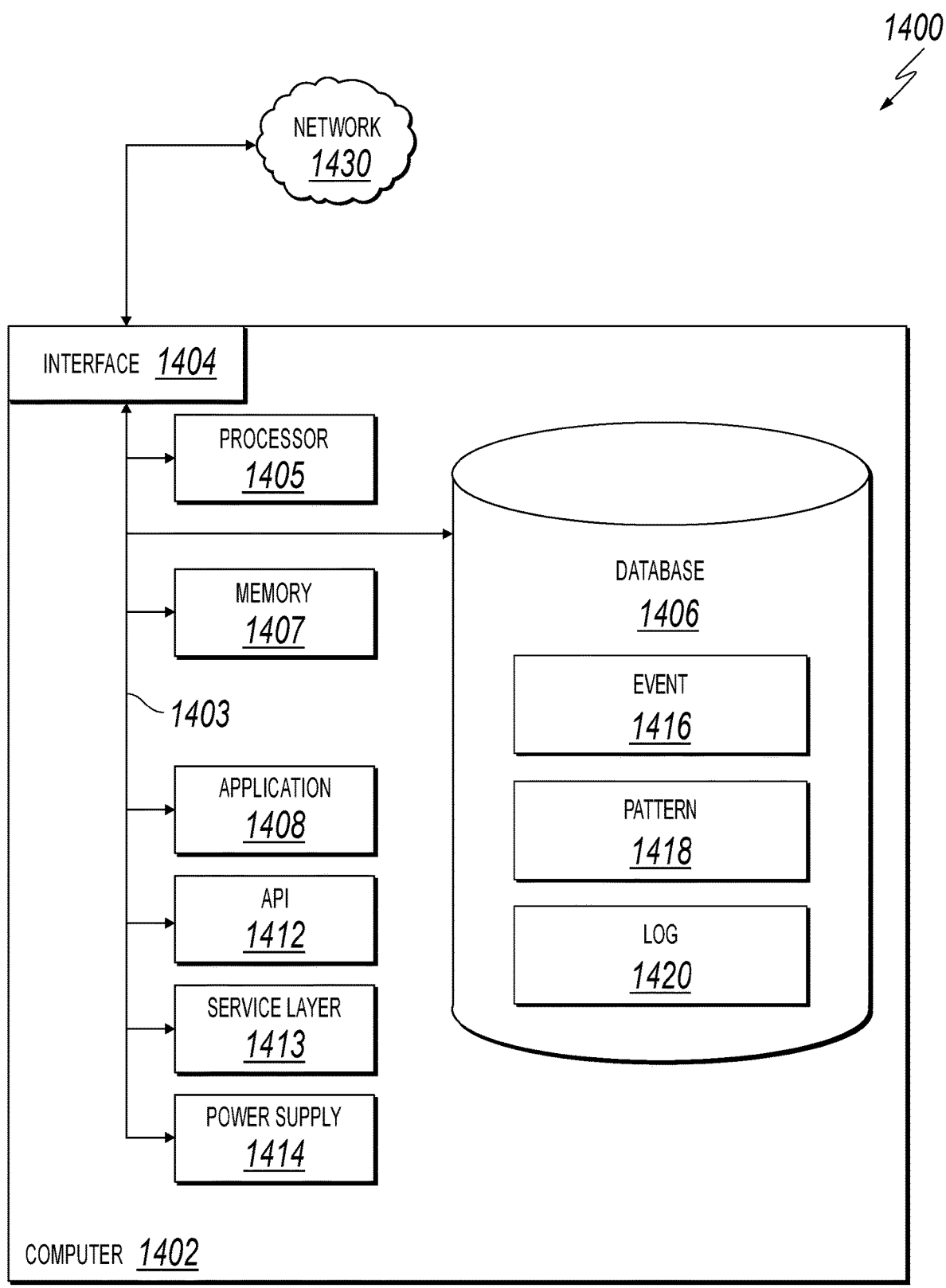
FIG. 14 is a block diagram illustrating an example of a computer-implemented system used to provide computational functionalities associated with described algorithms, methods, functions, processes, flows, and procedures, according to an implementation of the present disclosure.

FIG. 14 is a block diagram illustrating an example of a computer-implemented System 1400 used to provide computational functionalities associated with described algorithms, methods, functions, processes, flows, and procedures, according to an implementation of the present disclosure. In the illustrated implementation, System 1400 includes a Computer 1402 and a Network 1430.

The illustrated Computer 1402 is intended to encompass any computing device such as a server, desktop computer, laptop/notebook computer, wireless data port, smart phone, personal data assistant (PDA), tablet computer, one or more processors within these devices, another computing device, or a combination of computing devices, including physical or virtual instances of the computing device, or a combination of physical or virtual instances of the computing device. Additionally, the Computer 1402 can include an input device, such as a keypad, keyboard, touch screen, another input device, or a combination of input devices that can accept user information, and an output device that conveys information associated with the operation of the Computer 1402, including digital data, visual, audio, another type of information, or a combination of types of information, on a graphical-type user interface (UI) (or GUI) or other UI.

The Computer 1402 can serve in a role in a distributed computing system as a client, network component, a server, a database or another persistency, another role, or a combination of roles for performing the subject matter described in the present disclosure. The illustrated Computer 1402 is communicably coupled with a Network 1430. In some implementations, one or more components of the Computer 1402 can be configured to operate within an environment, including cloud-computing-based, local, global, another environment, or a combination of environments.

At a high level, the Computer 1402 is an electronic computing device operable to receive, transmit, process, store, or manage data and information associated with the described subject matter. According to some implementations, the Computer 1402 can also include or be communicably coupled with a server, including an application server, e-mail server, web server, caching server, streaming data server, another server, or a combination of servers.

The Computer 1402 can receive requests over Network 1430 (for example, from a client software application executing on another Computer 1402) and respond to the received requests by processing the received requests using a software application or a combination of software applications. In addition, requests can also be sent to the Computer 1402 from internal users (for example, from a command console or by another internal access method), external or third-parties, or other entities, individuals, systems, or computers.

Each of the components of the Computer 1402 can communicate using a System Bus 1403. In some implementations, any or all of the components of the Computer 1402, including hardware, software, or a combination of hardware and software, can interface over the System Bus 1403 using an application programming interface (API) 1412, a Service Layer 1413, or a combination of the API 1412 and Service Layer 1413. The API 1412 can include specifications for routines, data structures, and object classes. The API 1412 can be either computer-language independent or dependent and refer to a complete interface, a single function, or even a set of APIs. The Service Layer 1413 provides software services to the Computer 1402 or other components (whether illustrated or not) that are communicably coupled to the Computer 1402. The functionality of the Computer 1402 can be accessible for all service consumers using the Service Layer 1413. Software services, such as those provided by the Service Layer 1413, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the Computer 1402, alternative implementations can illustrate the API 1412 or the Service Layer 1413 as stand-alone components in relation to other components of the Computer 1402 or other components (whether illustrated or not) that are communicably coupled to the Computer 1402. Moreover, any or all parts of the API 1412 or the Service Layer 1413 can be implemented as a child or a sub-module of another software module, enterprise application, or hardware module without departing from the scope of the present disclosure.

The Computer 1402 includes an Interface 1404. Although illustrated as a single Interface 1404, two or more Interfaces 1404 can be used according to particular needs, desires, or particular implementations of the Computer 1402. The Interface 1404 is used by the Computer 1402 for communicating with another computing system (whether illustrated or not) that is communicatively linked to the Network 1430 in a distributed environment. Generally, the Interface 1404 is operable to communicate with the Network 1430 and includes logic encoded in software, hardware, or a combination of software and hardware. More specifically, the Interface 1404 can include software supporting one or more communication protocols associated with communications such that the Network 1430 or hardware of Interface 1404 is operable to communicate physical signals within and outside of the illustrated Computer 1402.

The Computer 1402 includes a Processor 1405. Although illustrated as a single Processor 1405, two or more Processors 1405 can be used according to particular needs, desires, or particular implementations of the Computer 1402. Generally, the Processor 1405 executes instructions and manipulates data to perform the operations of the Computer 1402 and any algorithms, methods, functions, processes, flows, and procedures as described in the present disclosure.

The Computer 1402 also includes a Database 1406 that can hold data for the Computer 1402, another component communicatively linked to the Network 1430 (whether illustrated or not), or a combination of the Computer 1402 and another component. For example, Database 1406 can be an in-memory, conventional, or another type of database storing data consistent with the present disclosure. In some implementations, Database 1406 can be a combination of two or more different database types (for example, a hybrid in-memory and conventional database) according to particular needs, desires, or particular implementations of the Computer 1402 and the described functionality. Although illustrated as a single Database 1406, two or more databases of similar or differing types can be used according to particular needs, desires, or particular implementations of the Computer 1402 and the described functionality. While Database 1406 is illustrated as an integral component of the Computer 1402, in alternative implementations, Database 1406 can be external to the Computer 1402. As illustrated, the Database 1406 holds the previously described Event 1416, Pattern 1418, and Log 1420.

The Computer 1402 also includes a Memory 1407 that can hold data for the Computer 1402, another component or components communicatively linked to the Network 1430 (whether illustrated or not), or a combination of the Computer 1402 and another component. Memory 1407 can store any data consistent with the present disclosure. In some implementations, Memory 1407 can be a combination of two or more different types of memory (for example, a combination of semiconductor and magnetic storage) according to particular needs, desires, or particular implementations of the Computer 1402 and the described functionality. Although illustrated as a single Memory 1407, two or more Memories 1407 or similar or differing types can be used according to particular needs, desires, or particular implementations of the Computer 1402 and the described functionality. While Memory 1407 is illustrated as an integral component of the Computer 1402, in alternative implementations, Memory 1407 can be external to the Computer 1402.

The Application 1408 is an algorithmic software engine providing functionality according to particular needs, desires, or particular implementations of the Computer 1402, particularly with respect to functionality described in the present disclosure. For example, Application 1408 can serve as one or more components, modules, or applications. Further, although illustrated as a single Application 1408, the Application 1408 can be implemented as multiple Applications 1408 on the Computer 1402. In addition, although illustrated as integral to the Computer 1402, in alternative implementations, the Application 1408 can be external to the Computer 1402.

The Computer 1402 can also include a Power Supply 1414. The Power Supply 1414 can include a rechargeable or non-rechargeable battery that can be configured to be either user- or non-user-replaceable. In some implementations, the Power Supply 1414 can include power-conversion or management circuits (including recharging, standby, or another power management functionality). In some implementations, the Power Supply 1414 can include a power plug to allow the Computer 1402 to be plugged into a wall socket or another power source to, for example, power the Computer 1402 or recharge a rechargeable battery.

There can be any number of Computers 1402 associated with, or external to, a computer system containing Computer 1402, each Computer 1402 communicating over Network 1430. Further, the term "client", "user", or other appropriate terminology can be used interchangeably, as appropriate, without departing from the scope of the present disclosure. Moreover, the present disclosure contemplates that many users can use one Computer 1402, or that one user can use multiple computers 1402.

Described implementations of the subject matter can include one or more features, alone or in combination.

For example, in a first implementation, a computer-implemented method, comprising: selecting a filter from one or more filters defined for an ETD Network Graph; fetching Events from the selected log files based on the selected filter; identifying entities based on the fetched Events; determining relationships between the identified entities; displaying the determined relationships and identified entities in the ETD Network Graph; selecting an identified entity to filter data in an ETD Event Series Chart; selecting an Event in the ETD Event Series Chart to display Event Attributes in an Event Attribute Dialog; and selecting an Event Attribute in the Event Attribute Dialog to filter Events in the ETD Event Series Chart.

The foregoing and other described implementations can each, optionally, include one or more of the following features:

A first feature, combinable with any of the following features, comprising selecting the one or more log files for ETD analysis containing logged Events associated with one or more entities.

A second feature, combinable with any of the previous or following features, comprising generating a case file for later ETD analysis based on a selected event in the ETD Event Series Chart.

A third feature, combinable with any of the previous or following features, wherein the one or more defined filters include a timeframe, Alert, or an ETD Pattern A fourth feature, combinable with any of the previous or following features, wherein the Event Series Chart comprises two identical time axes.

A fifth feature, combinable with any of the previous or following features, comprising enabling zooming and panning functionality for the ETD Event Series Chart.

A sixth feature, combinable with any of the previous or following features, comprising enabling tooltip functionality for Attribute values associated with each displayed Event in the ETD Event Series Chart and displayed graphical element in the ETD Network Graph.

In a second implementation, a non-transitory, computer-readable medium storing one or more instructions executable by a computer system to perform operations comprising: selecting a filter from one or more filters defined for an ETD Network Graph; fetching Events from the selected log files based on the selected filter; identifying entities based on the fetched Events; determining relationships between the identified entities; displaying the determined relationships and identified entities in the ETD Network Graph; selecting an identified entity to filter data in an ETD Event Series Chart; selecting an Event in the ETD Event Series Chart to display Event Attributes in an Event Attribute Dialog; and selecting an Event Attribute in the Event Attribute Dialog to filter Events in the ETD Event Series Chart.

The foregoing and other described implementations can each, optionally, include one or more of the following features:

A first feature, combinable with any of the following features, comprising one or more instructions to select the one or more log files for ETD analysis containing logged Events associated with one or more entities.

A second feature, combinable with any of the previous or following features, comprising one or more instructions to generate a case file for later ETD analysis based on a selected event in the ETD Event Series Chart.

A third feature, combinable with any of the previous or following features, wherein the one or more defined filters include a timeframe, Alert, or an ETD Pattern.

A fourth feature, combinable with any of the previous or following features, wherein the Event Series Chart comprises two identical time axes.

A fifth feature, combinable with any of the previous or following features, comprising one or more instructions to enable zooming and panning functionality for the ETD Event Series Chart.

A sixth feature, combinable with any of the previous or following features, comprising one or more instructions to enable tooltip functionality for Attribute values associated with each displayed Event in the ETD Event Series Chart and displayed graphical element in the ETD Network Graph.

In a third implementation, a computer-implemented system, comprising: one or more computers; and one or more computer memory devices interoperably coupled with the one or more computers and having tangible, non-transitory, machine-readable media storing one or more instructions that, when executed by the one or more computers, perform one or more operations comprising: selecting a filter from one or more filters defined for an ETD Network Graph; fetching Events from the selected log files based on the selected filter; identifying entities based on the fetched Events; determining relationships between the identified entities; displaying the determined relationships and identified entities in the ETD Network Graph; selecting an identified entity to filter data in an ETD Event Series Chart; selecting an Event in the ETD Event Series Chart to display Event Attributes in an Event Attribute Dialog; and selecting an Event Attribute in the Event Attribute Dialog to filter Events in the ETD Event Series Chart.

The foregoing and other described implementations can each, optionally, include one or more of the following features:

A first feature, combinable with any of the following features, comprising one or more operations to select the one or more log files for ETD analysis containing logged Events associated with one or more entities.

A second feature, combinable with any of the previous or following features, comprising one or more operations to generate a case file for later ETD analysis based on a selected event in the ETD Event Series Chart.

A third feature, combinable with any of the previous or following features, wherein the one or more defined filters include a timeframe, Alert, or an ETD Pattern.

A fourth feature, combinable with any of the previous or following features, wherein the Event Series Chart comprises two identical time axes.

A fifth feature, combinable with any of the previous or following features, comprising one or more operations to enable zooming and panning functionality for the ETD Event Series Chart.

A sixth feature, combinable with any of the previous or following features, comprising one or more operations to enable tooltip functionality for Attribute values associated with each displayed Event in the ETD Event Series Chart and displayed graphical element in the ETD Network Graph.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time", "real time", "realtime", "real (fast) time (RFT)", "near(ly) real-time (NRT)", "quasi real-time", or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus", "computer", or "electronic computer device" (or an equivalent term as understood by one of ordinary skill in the art) refer to data processing hardware and encompass all kinds of apparatuses, devices, and machines for processing data, including by way of example, a programmable processor, a computer, or multiple processors or computers. The computer can also be, or further include special purpose logic circuitry, for example, a central processing unit (CPU), an FPGA (field programmable gate array), or an ASIC (application-specific integrated circuit). In some implementations, the computer or computer-implemented system or special purpose logic circuitry (or a combination of the computer or computer-implemented system and special purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/−R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface", or "GUI", can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, Frame Relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventive concept or on the scope of what can be claimed, but rather as descriptions of features that can be specific to particular implementations of particular inventive concepts. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
   selecting one or more log files containing Events associated with one or more entities for Enterprise Threat Detection (ETD) analysis;
   selecting a filter from one or more filters defined for an ETD Network Graph;
   fetching Events from the selected one or more log files based on the selected filter;
   identifying entities based on the fetched Events;

determining relationships between the identified entities;
enabling tooltip functionality for Attribute values associated with one or more Events displayed in an ETD Event Series Chart and one or more displayed graphical elements in the ETD Network Graph;
displaying the determined relationships and identified entities in the ETD Network Graph;
selecting an identified entity to filter data in the ETD Event Series Chart;
selecting an Event in the ETD Event Series Chart to display Event Attributes in an Event Attribute Dialog; and
selecting an Event Attribute in the Event Attribute Dialog to filter Events in the ETD Event Series Chart.

2. The computer-implemented method of claim 1, comprising generating a case file for later ETD analysis based on a selected event in the ETD Event Series Chart.

3. The computer-implemented method of claim 1, wherein the one or more defined filters include a timeframe, Alert, or an ETD Pattern.

4. The computer-implemented method of claim 1, wherein the Event Series Chart comprises two identical time axes.

5. The computer-implemented method of claim 1, comprising enabling zooming and panning functionality for the ETD Event Series Chart.

6. A non-transitory, computer-readable medium storing one or more instructions executable by a computer system to perform operations comprising:
 selecting one or more log files containing Events associated with one or more entities for Enterprise Threat Detection (ETD) analysis;
 selecting a filter from one or more filters defined for an ETD Network Graph;
 fetching Events from the selected one or more log files based on the selected filter;
 identifying entities based on the fetched Events;
 determining relationships between the identified entities;
 enabling tooltip functionality for Attribute values associated with one or more Events displayed in an ETD Event Series Chart and one or more displayed graphical elements in the ETD Network Graph;
 displaying the determined relationships and identified entities in the ETD NetworkGraph;
 selecting an identified entity to filter data in the ETD Event Series Chart;
 selecting an Event in the ETD Event Series Chart to display Event Attributes in an Event Attribute Dialog; and
 selecting an Event Attribute in the Event Attribute Dialog to filter Events in the ETD Event Series Chart.

7. The non-transitory, computer-readable medium of claim 6, comprising one or more instructions to generate a case file for later ETD analysis based on a selected event in the ETD Event Series Chart.

8. The non-transitory, computer-readable medium of claim 6, wherein the one or more defined filters include a timeframe, Alert, or an ETD Pattern.

9. The non-transitory, computer-readable medium of claim 6, wherein the Event Series Chart comprises two identical time axes.

10. The non-transitory, computer-readable medium of claim 6, comprising one or more instructions to enable zooming and panning functionality for the ETD Event Series Chart.

11. A computer-implemented system, comprising:
 one or more computers; and
 one or more computer memory devices interoperably coupled with the one or more computers and having tangible, non-transitory, machine-readable media storing one or more instructions that, when executed by the one or more computers, perform one or more operations comprising:
  selecting one or more log files containing Events associated with one or more entities for Enterprise Threat Detection (ETD) analysis;
  selecting a filter from one or more filters defined for an ETD Network Graph;
  fetching Events from the selected one or more log files based on the selected filter;
  identifying entities based on the fetched Events;
  determining relationships between the identified entities;
  enabling tooltip functionality for Attribute values associated with one or more Events displayed in an ETD Event Series Chart and one or more displayed graphical elements in the ETD Network Graph;
  displaying the determined relationships and identified entities in the ETD Network Graph;
  selecting an identified entity to filter data in the ETD Event Series Chart;
  selecting an Event in the ETD Event Series Chart to display Event Attributes in an Event Attribute Dialog; and
  selecting an Event Attribute in the Event Attribute Dialog to filter Events in the ETD Event Series Chart.

12. The computer-implemented system of claim 11, comprising one or more operations to generate a case file for later ETD analysis based on a selected event in the ETD Event Series Chart.

13. The computer-implemented system of claim 11, wherein the one or more defined filters include a timeframe, Alert, or an ETD Pattern.

14. The computer-implemented system of claim 11, wherein the Event Series Chart comprises two identical time axes.

15. The computer-implemented system of claim 11, comprising one or more operations to enable zooming and panning functionality for the ETD Event Series Chart.

* * * * *